(12) United States Patent
Mookanahallipatna Ramasesha et al.

(10) Patent No.: US 10,684,392 B2
(45) Date of Patent: Jun. 16, 2020

(54) METHOD TO GENERATE THE IN-SITU STATE OF STRESS IN A DOMAIN Ω IN A GEOLOGICAL STRUCTURE

(71) Applicants: REPSOL, S.A., Madrid (ES); UNIVERSIDAD POLITÉCNICA DE CATALUÑA, Barcelona (ES)

(72) Inventors: Lakshmikantha Mookanahallipatna Ramasesha, Madrid (ES); José María Segura Serra, Madrid (ES); Jose Alvarellos Iglesias, Madrid (ES); Ignacio Carol Vilarasau, Barcelona (ES); Pere Prat Catalan, Barcelona (ES); Ignasi Aliguer Piferrer, Barcelona (ES); Daniel Garolera Vinent, Barcelona (ES)

(73) Assignees: REPSOL, S.A., Madrid (ES); UNIVERSIDAD POLITÉCNICA DE CATALUÑA, Barcelona (ES)

( * ) Notice: Subject to any disclaimer, the term of this patent is extended or adjusted under 35 U.S.C. 154(b) by 445 days.

(21) Appl. No.: 15/111,725

(22) PCT Filed: Jan. 14, 2015

(86) PCT No.: PCT/EP2015/050591
§ 371 (c)(1),
(2) Date: Jul. 14, 2016

(87) PCT Pub. No.: WO2015/107079
PCT Pub. Date: Jul. 23, 2015

(65) Prior Publication Data
US 2016/0334544 A1   Nov. 17, 2016

(30) Foreign Application Priority Data

Jan. 14, 2014   (EP) .................................. 14382009

(51) Int. Cl.
*G01V 99/00*   (2009.01)
*G01V 11/00*   (2006.01)
(Continued)

(52) U.S. Cl.
CPC ............ *G01V 99/005* (2013.01); *G01V 11/00* (2013.01); *G06F 17/13* (2013.01); *G06F 30/20* (2020.01);
(Continued)

(58) Field of Classification Search
CPC .. G01V 99/005; G01V 11/00; G01V 2210/62; G01V 2210/665; G01V 2210/64;
(Continued)

(56) References Cited

U.S. PATENT DOCUMENTS

| | | | |
|---|---|---|---|
| 2008/0071505 A1* | 3/2008 | Huang .................. | G01V 11/00 703/2 |
| 2010/0121623 A1* | 5/2010 | Yogeswaren .......... | G01V 11/00 703/2 |
| 2011/0182144 A1* | 7/2011 | Gray ....................... | G01V 1/30 367/75 |

OTHER PUBLICATIONS

Rojek, et al., "Setting up virgin stress conditions in discrete element models," Computers and Geotechnics vol. 48 pp. 228-248. (Year: 2013).*

(Continued)

*Primary Examiner* — Rehana Perveen
*Assistant Examiner* — Steven W Crabb
(74) *Attorney, Agent, or Firm* — Reising Ethington, P.C.

(57) ABSTRACT

The invention relates to a method and a computer-implemented invention for numerical modeling of a geological structure. The present invention solves the problem providing a method for use in the numerical simulation of the in-situ stress in a geological structure represented by a domain Ω located under its external ground surface S. The method comprises mainly two steps: determining a first state (Continued)

of in-situ stress in the domain Ω by means of six stress components and a second step determining a correction of the first state of stress in order to satisfy the equilibrium equation.

9 Claims, 19 Drawing Sheets

(51) Int. Cl.
    *G06F 30/20*     (2020.01)
    *G06F 17/13*     (2006.01)
    *G06F 111/10*     (2020.01)

(52) U.S. Cl.
    CPC ...... *G01V 2210/62* (2013.01); *G01V 2210/64* (2013.01); *G01V 2210/665* (2013.01); *G06F 2111/10* (2020.01)

(58) Field of Classification Search
    CPC ... G06F 17/5009; G06F 17/13; G06F 2217/16
    See application file for complete search history.

(56) References Cited

OTHER PUBLICATIONS

Kozak, et al., "Complete Solution for Stresses in Terms of Stress Functions Part 1: Derivation from the Principle of Virtual Work" Technische Mechanik, Band 16, Heft 2 pp. 147-168 (Year: 1995).*
D. Kuhl et al., "Lecture Notes Finite Element Methods in Linear Structural Mechanics", May 31, 2005, pp. 1-209.
G. Cailletaud "Finite Element: Matrix Formulation Contents", Nov. 21, 2005, pp. 1-67.
Evert Hoek "In situ and induced stresses", Dec. 31, 2007, URL:http://www.rocscience.com/hoek/corner/10_In_situ_and_induced_stresses.pdf, 4 pages.
Jing L. : "A review of techniques, advances and outstanding issues in numerical modeling for rock mechanics and rock mechanics and rock engineering", International Journal of Rock Mechanics and Mining Sciences, Pergamon, United Kingdom, vol. 40, No. 3, Apr. 1, 2003, pp. 283-353.
Boltengagen, I.L., 1999. "Modeling of initial stresses and weakening surfaces by Finite Element Method". Journal of Mining Science, 35 (2): 150-159.
Bauer, S.J., Holland, J.F: and Parrish, D.K., 1985. "Implications about in situ stress at Yucca Mountain". 26th U.S. Symposium on Rock Mechanics, pp. 1113-1120.
Madyarov, A.I. and Savitski, A.A., 2010. "Numerical algorithm for constructing 3D initial stress field matching field measurement", 44th US Rock Mechanics Symposium. American Rock Mechanics Association, Salt Lake City, UT. Paper No. ARMA 10-324; 8 pages.
Parris, D.K. and Labreche, D.A., 1988. "Initializing the equilibrium stress state for stress analyses in geomechanics". In: P-A. Cundall, A.M. Starfield and R.L. Sterling (Editors), Key questions in Rock Mechanics—29th U.S. Symposium on Rock Mechanics. Taylor & Francis, Minneapolis, MN, pp. 303-310.
Price, R.H. and Bauer, S.J. 1985. "Analysis of the elastic and strength properties of Yucca Mountain tuff, Nevada". 26th U.S. Symposium on Rock Mechanics. Paper No. ARMA 85-089-1, 8 pages.
International Search Report dated May 8, 2015 for PCT/EP2015/050591, 2 pages.
S. Tou; "Visualization of fields and applications in engineering", Apr. 30, 2011, Chapter 6.3 Tensor Description and Representation, pp. 201 and 202.

* cited by examiner

METHOD TO GENERATE THE IN-SITU STATE OF STRESS IN A DOMAIN Ω IN A GEOLOGICAL STRUCTURE

RELATED APPLICATION

This application is the National Stage of International Patent Application No. PCT/EP2015/050591, filed on Jan. 14, 2015, which claims priority to and all the advantages of European Patent Application No. EP14382009.0, filed Jan. 14, 2014.

OBJECT OF THE INVENTION

The invention relates to a method and a computer-implemented invention for numerical modeling of a geological structure.

PRIOR ART

Geological materials located at a certain depth are subjected to stresses, whether from gravitational or tectonic origin or residual stresses from previous geological activity.

Gravitational stress is induced by the weight of the overburden; the residual stress is contributed by strain energy stored in the rock during the geological past; and, the tectonic stress is caused by current tectonic forces affecting the region. When measurements are made at a particular site, the instruments sense the combined contribution of these three components.

Greenfield conditions are the un-modified initial stresses that exist within the ground, arising from the various geological processes that it has been subjected to. These stresses are modified by construction or any other man-made activity.

When an opening is excavated in these materials, or the conditions are changed in some other way, e.g. pore pressure variations induced by fluid injection or extraction in a reservoir, the local stress field is modified so that a new set of stresses appear in the rock mass.

Knowledge of the magnitudes and directions of both pre-existing (greenfield) and man-induced stresses is an essential component of any geomechanical analysis, since for instance if the existing stresses values are near the limit strength of the material, the new stress may more easily reach that strength and potentially lead to failure or collapse.

Together with the details of geologic structure, in-situ stresses existing in the ground constitute one of the most important starting data for the analysis. Developing stresses depend essentially upon in-situ stresses, and on pore pressures also related to the in-situ situation. A good definition of these in-situ stresses is therefore essential.

Following the generation of the finite element mesh, and before any future activities can be analyzed, the initial conditions in the ground must therefore be established.

In the most general context, this could be ideally achieved by modeling the complete geological history of the site, if that is known. However, if that is not known, or the necessary analysis is too complicated, the initial conditions may be achieved by various different simplified procedures, which may lead to significantly different in-situ stress states. Because of its important consequences for the subsequent analysis, it is therefore important to understand and select the right procedure for initialization of in-situ stresses in Finite Elements calculations.

Throughout the document, the stress tensor is expressed as a stress vector, because the computer methods that usually carry out the invention manipulate this stress tensor in this vector form. However, the method according to the invention can be carried out with other ways of expressing the stress tensor, as the method relates to the operations that are realized over its components.

The invention presented herein is a new such method of estimating the in-situ stress conditions with no need of simulating the evolution of the geological history.

DESCRIPTION OF THE INVENTION

The present invention solves the problem providing a method for use in the generation of an estimate of the in-situ stress field in a geological structure represented by a domain Ω. The method comprises the steps:

a) determining a first state of in-situ stress, representable as the vector $\sigma^{prop}$ expressible by means of the stress components $\sigma_{xx}$, $\sigma_{yy}$, $\sigma_{zz}$, $\sigma_{xy}$, $\sigma_{xz}$, $\sigma_{yz}$, in the domain Ω;

This first step a) starts with an estimated guess of the in-situ stress field that satisfies the desired vertical/horizontal stress ratio or any other condition that is considered to affect the in-situ stresses. The stress ratios may be obtained from tectonic stress data bases and even corrected with additional local data. When determining a first state of in-situ stress by means of the stress components it must be interpreted that the method is formulated in the more general scenario, i.e. a three-dimensional domain. If for instance a two dimensional domain is used then only existing variables will be involved in the calculation; that is, ($\sigma_{xx}$, $\sigma_{zz}$, $\sigma_{xz}$). The other horizontal stress $\sigma_{yy}$ exists but it can be calculated from existing variables as a result of a postprocessing step. The same interpretation applies to a coordinate such as $x=(x_0, y_0, z_0)$ being in the two-dimensional case modeled only as $x=(x_0, z_0)$.

The estimated guess obtained as a result of step a) is not always in equilibrium. Therefore, the method comprises a subsequent step b) providing an equilibration stage by imposing forces to the numerical mesh that are equal and opposite to the nodal forces that reflect the stress imbalance. The unbalanced nodal forces (residual forces) are then applied and redistributed in a single calculation (in the case of a linear elastic material), or according to an embodiment, in an iterative process until its components are sufficiently small (in the case of a non-linear elastic material). This step b) is carried out by means of sub-stages b.1) to b.9):

b) determining a correction $\sigma^{corr}$ of the first state of in-situ stress $\sigma^{prop}$ carrying out the following steps:

b.1) determining a finite element discretization of the domain Ω by means of a numerical mesh, being $\Omega_e$ the domain of a particular finite element;

b.2) determining the boundary conditions on the boundary B of the numerical mesh of the domain Ω, comprised of Dirichlet or prescribed displacements on a part $B_1$ of the boundary B, and a Newmann or prescribed stresses on the remaining part $B_2$ of the boundary, being $B=B_1 \cup B_2$;

b.3) determining the gravity equivalent element force $f_e^{ext}$ in the numerical mesh for each element using the expression $$f_e^{ext} = \int_{\Omega_e} N^T \rho g \, dV$$

wherein N is the element shape function matrix, ρ is the mass density of the material and g is the gravity vector;

b.4) determining the internal element forces $f_e^{int}$ corresponding to the first state of in-situ stress obtained in the preceding step a) in the finite element mesh for all elements from the expression $$f_e^{int} = \int_{\Omega_e} B^T \sigma^{prop} dV$$

wherein B is the element matrix relating strains and nodal displacements, and $\sigma^{prop}$ is the stress tensor expressible as $(\sigma_{xx}, \sigma_{yy}, \sigma_{zz}, \sigma_{xy}, \sigma_{xz}, \sigma_{yz})^T$;

b.5) determining the element stress imbalance $f_e^{res}$ as the subtraction between the gravity equivalent element force and the internal element forces $$f_e^{res} = f_e^{ext} - f_e^{int}$$

b.6) assembling the element residual forces $f_e^{res}$ representing the stress imbalance at the element level into a global residual forces vector $f^{res}$, representing the stress imbalance in each node of the numerical mesh at the domain structural level; that is, each component of the global residual forces vector $f^{res}$ comprises the sum, extended over all elements, of the components of element residual forces $f_e^{res}$ related to the same node of said component of the global residual forces vector $f^{res}$; and, loading the domain discretized by the numerical mesh with the residual forces vector $f^{res}$ and solving the global system of equations $$Ku = f^{res}$$

where K is the global stiffness matrix and u is the global nodal displacements vector, with K resulting from the assembly of the individual elements stiffness matrix $K_e$ that corresponds to the integral over the volume of each finite element in the mesh:

$$K_e = \int_{\Omega_e} B^T EB \, dV$$

and the assembly procedure consists of the sum on the global stiffness matrix of the contribution of each individual stiffness matrix considering the transformation between the local numbering of each element and the global numeration at the structural level that accounts for the correspondence of degrees of freedom as it is standard procedure in finite element formulation. In the previous expression E is the elasticity stiffness matrix with components $E_{ijkl}$ that define the linear elastic behavior $\sigma_{ij} = E_{ijkl} \Delta \varepsilon_{kl}$, wherein $\sigma_{ij}$ is the stress tensor, $\varepsilon_{kl}$ is the strain tensor and $E_{ijkl}$ is the elasticity tensor, b.7) determining the deformation by means of the compatibility equation as $$\varepsilon_{kl} = \frac{1}{2}(u_{k,l} + u_{l,k})$$

b.8) determining the correction of the first state of in-situ stress by means of the material equation $$\Delta \sigma_{ij}^{corr} = E_{ijkl} \Delta \varepsilon_{kl}$$

where $E_{ijkl}$ is the same tensor of elasticity at each point of the domain, which has been used for the calculation of the global stiffness matrix K in step b.6).

b.9) provide the sought in-situ stress σ as the correction of the first state of in-situ stress given in step a) $\sigma^{prop} = (\sigma_{xx}, \sigma_{yy}, \sigma_{zz}, \sigma_{xy}, \sigma_{xz}, \sigma_{yz})$ as $\sigma^{prop} + \Delta\sigma^{corr}$.

After the correction, an in-situ stress field in equilibrium is obtained.

DESCRIPTION OF THE DRAWINGS

These and other features and advantages of the invention will be seen more clearly from the following detailed description of a preferred embodiment provided only by way of illustrative and non-limiting example in reference to the attached drawings.

DETAILED DESCRIPTION OF THE INVENTION

General Approach

Figure 1:
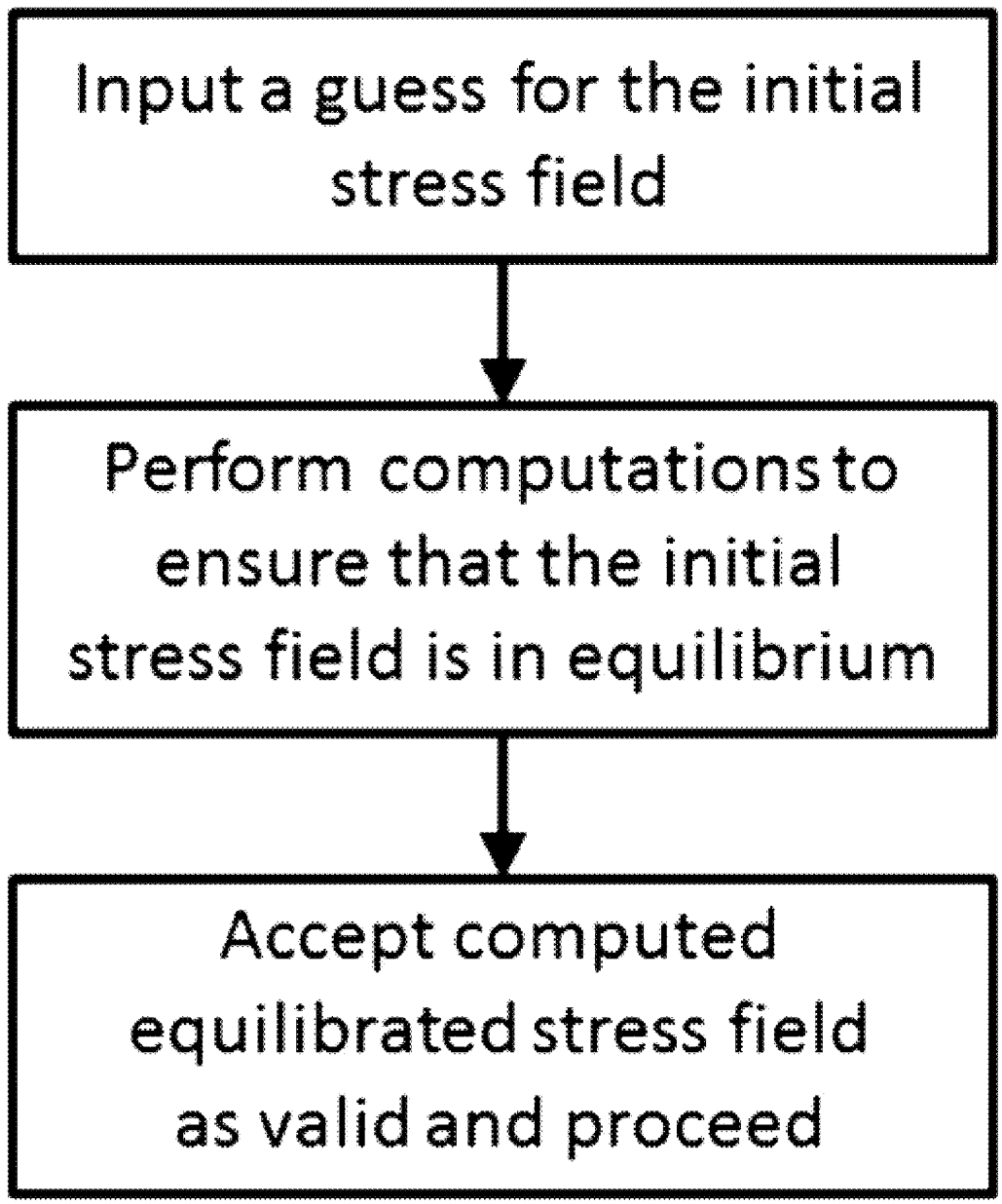
FIG. 1 This figure shows a scheme with the main steps of the method according to the invention.

In general terms, the set of governing equations commonly used for the mathematical solution of the stress-strain problem in a rock mass is composed of: (a) the Equilibrium Equations, (b) the Compatibility Equations, and (c) the Constitutive or Material Laws. In Cartesian coordinates and under the assumption of small strains, these laws are:

a) Equilibrium: $\sigma_{ij,j} + \rho_i = 0$
b) Compatibility: $\varepsilon_{kl} = \frac{1}{2}(u_{k,l} + u_{l,k})$
c) Material law: $\sigma_{ij} = f(\varepsilon_{kl}, \xi)$ in general, or $\sigma_{ij} = E_{ijkl}\varepsilon_{kl}$ for linear elastic materials, wherein is one or more internal variables (also called history variables) that may be present in the specific formulation used for inelastic material laws.

The previous set of partial differential equations, which are valid over the domain Ω limited by the boundary B, must be complemented with appropriate boundary conditions, in a general case in the form of:

d) Dirichlet or prescribed $u_i = \underline{u}_i$ on the part $B_1$ of the boundary where the displacements are known, and e) Newmann $\sigma_{ij}n_j=t_i$ on the remaining part $B_2$ of the boundary ($B=B_1 \cup B_2$) where the external forces are known.

In the case of in-situ stress calculations, which includes strictly speaking only the evaluation of the stress state, in the most relevant cases the only equations that must be strictly satisfied in the whole domain $\Omega$ are the equilibrium equations (a), together with the corresponding Newmann condition (e) on the part of the boundary $B_2$. The Material law (c) on its side must be satisfied sometimes and partially; only when the material is a non-linear elastic material with a limit stress condition (i.e. strength criterion or plastic stress limit), and in that case neither the strength criterion nor the plastic stress limit can be violated by the in-situ stress solution obtained.

In spite of this, the evaluation of the in-situ stress state in the prior art normally involves the solution of the whole set of equations (a)-(e) with some real or fictitious material parameters and some Dirichlet Boundary Conditions, although the resulting displacements and strains are normally discarded (and reset to zero values) after the calculation. The reasons for solving the whole system are:

The system of equilibrium equations (a)+Newmann Boundary Conditions (e), with or without the constraints given by the stress limits of the material law (c), does not constitute a complete set of equations. That is, there are more unknowns than equations, and therefore such system has an infinite number of solutions that correspond to the many possible in-situ stress states that may exist on a given domain, depending for instance on geological and tectonic history.

Finite Elements codes are normally only prepared to solve the full system of equations (a)-(e), that is with certain values of material parameters and Dirichlet Boundary Conditions on $B_1$. The solutions obtained in this way for stresses indeed satisfy equilibrium conditions (a) and (e).

The particular material laws and parameters used for the in-situ stress calculations do not have to correspond necessarily to a realistic material behavior. They may be assigned fictitious values, which are chosen for convenience in order to generate the desired effects, such as for instance the desired ratio of vertical to horizontal stresses $K_0=\sigma_h/\sigma_v$.

Concerning the validity of the assumption of small strain, it is also true that in its previous geological history until the current in-situ state, the material may have been subject to large strains. However, the usual methods for the calculation of in-situ stress do not try to follow the stress-strain history of the rock material through its geologic history (in general very complicated and often uncertain), but to obtain the current stress state on the basis of an estimate which satisfies mathematically the equilibrium conditions and, on the other hand, approaches as much as possible the remaining information that is available on the in-situ stress distribution.

As for pore pressures, in a particular embodiment in-situ pore pressures are evaluated separately based on relatively simple assumptions, generally hydrostatic distributions, with reference values based on available information. Some particular examples are those wherein the pore pressure is obtained from advanced models based on field measures or seismic data.

In some embodiments where that is required for the in-situ stress Finite Elements calculation (i.e. if the material is assumed as a non-linear elastic material) those pore pressures are then introduced as fixed prescribed values at each point, in the iterative calculation process between strain and (total) stress.

Simplified procedures similar to the ones used for the pore pressures may be employed for parts of the domain that may represent geological materials that exhibit viscous incompressible flow in the long term, such as salt domes, since that behavior leads to stress fields that are also practically hydrostatic.

A particular embodiment of a method according to the invention comprises the following steps:

Step a) Initial Estimate of the In-Situ Stress State

The process starts providing an estimate $\sigma^{prop}$ of the existing in-situ stress state, expressible by means of the stress components $\sigma_{xx}, \sigma_{yy}, \sigma_{zz}, \sigma_{xy}, \sigma_{xz}, \sigma_{yz}$. This does not need to be an exact evaluation, and the stress field proposed in this step does not need to strictly verify the equilibrium conditions of equation (a), since a correction step will be performed later. However, it is convenient that the estimate:

satisfies as exactly as possible the characteristics of the in-situ field as known from field measurements or other sources (e.g. World-Stress-Map, www.world-stress-map.com);

is as close as possible to equilibrium, so that the variations that will take place after the correction step will be minimized, and therefore the final equilibrated state will deviate as little as possible from the proposed stress state To unambiguously assess the closeness of this estimate to equilibrium, the lower the residual given by the expression $\|\mu\sigma_{ij,j}^{prop}+\rho g_i\|$ is, the closer is the estimate to the equilibrium.

According to this invention, three alternative embodiments of the method are considered to generate the first estimate of in-situ stresses:

1) Taking the vertical stress as a function of the depth of the corresponding element or Gauss point, with simultaneous estimate of the horizontal stress ratio based on an input value of parameter $K_0$. Therefore, in this case the estimate of the in-situ stress will exhibit vertical and horizontal principal directions, and the following stress values:

a. $\sigma_{xx}=\sigma_H$, $\sigma_{yy}=\sigma_h$, $\sigma_{zz}=\sigma_V$, $\sigma_{xy}=0$, $\sigma_{xz}=0$, $\sigma_{yz}=0$ b. where $\sigma_V=\int\gamma\,dz$, $\sigma_h=K_0\sigma_v$ and $\sigma_H=K_{an}\sigma_h$, wherein $\gamma$ is the specific weight of the material, $K_0$ is the ratio between the minimum horizontal stress and vertical stress, and $K_{an}$ is a predetermined horizontal stress ratio estimating the horizontal stress anisotropy.

In case of two-dimensional analysis, the stress values are, in a simplified form, the following:

a. $\sigma_{zz}=\int\gamma\,dz$, $\sigma_{xx}=K_0\sigma_{zz}$, $\tau_{xz}=0$ b. where $\gamma$ is the specific weight of the material, and $K_0$ the desired horizontal-to-vertical stress ratio.

Former integral values $\sigma_v=\int\gamma\,dz$, or $\sigma_{zz}=\int\gamma\,dz$ may be generalized when the vertical stress is known at certain depth $\sigma_{v_0}$ wherein the calculation are expressed as $\sigma_v=\int\gamma\,dz+\sigma_{v_0}$, or $\sigma_{zz}=\int\gamma\,dz+\sigma_{v_0}$ being the integral extended along a path defined from the depth where $\sigma_{v_0}$ is taken until the depth where the $\sigma_V$ or $\sigma_{zz}$ is calculated.

2) Subdividing geometrically the domain of interest in a collection of subdomains, and using for each of them a minimization procedure involving the so-called stress functions, which are scalar potential functions leading to stress fields as their derivatives.

For general three-dimensional analysis, these scalar potential functions are the so-called Maxwell stress functions A(x,y,z), B(x,y,z), C(x,y,z) from which the various stress components follow:

$$\sigma_{xx} = \frac{\partial^2 B}{\partial z^2} + \frac{\partial^2 C}{\partial y^2} + K_{0x}\gamma z + \sigma_{xx0}$$

$$\sigma_{yy} = \frac{\partial^2 C}{\partial x^2} + \frac{\partial^2 A}{\partial z^2} + K_{0y}\gamma z + \sigma_{yy0}$$

$$\sigma_{zz} = \frac{\partial^2 A}{\partial y^2} + \frac{\partial^2 B}{\partial x^2} + \gamma z + \sigma_{zz0}$$

$$\sigma_{xy} = -\frac{\partial^2 C}{\partial x \partial y} + \sigma_{xy0}; \sigma_{xz} = -\frac{\partial^2 B}{\partial x \partial z} + \sigma_{xz0}; \sigma_{yz} = -\frac{\partial^2 A}{\partial y \partial z} + \sigma_{yz0}$$

wherein $K_{0x}$ and $K_{0y}$ are the predefined ratios of horizontal-to-vertical stresses in the x- and y-directions respectively, $\sigma_{xx0}$, $\sigma_{yy0}$, $\sigma_{zz0}$, $\sigma_{xy0}$, $\sigma_{xz0}$ and $\sigma_{yz0}$ represent the values of the in-situ stress state at the point $x=y=z=0$ of the domain $\Omega$, and wherein $A(x,y,z)$, $B(x,y,z)$, $C(x,y,z)$ are three functions that must obey the additional following condition:

$$\nabla^4 A + \nabla^4 B + \nabla^4 C = \frac{3}{2-v}\left(\frac{\partial^2 A}{\partial x^2} + \frac{\partial^2 B}{\partial y^2} + \frac{\partial^2 C}{\partial z^2}\right)$$

under the boundary conditions, wherein v is the Poisson ratio.

In the particular case of a two-dimensional analysis, the stress components to be specified and explicitly involved in the solution of the partial differential equations are only three ($\sigma_{xx}$, $\sigma_{zz}$, $\sigma_{xz}$). In this case the scalar potential function is known as the Airy stress function $\varphi(x,z)$ from which the stresses are derived:

$$\sigma_{xx} = \frac{\partial^2 \varphi}{\partial z^2} + K_0\gamma z + \sigma_{xx0}; \sigma_{zz} = \frac{\partial^2 \varphi}{\partial x^2} + \gamma z + \sigma_{zz0}; \sigma_{xz} = -\frac{\partial^2 \varphi}{\partial x \partial z} + \sigma_{xz0}$$

wherein $\varphi(x,z)$ is a function determined from the boundary conditions, which automatically satisfies the differential equations of equilibrium within the domain. (Note that if $\varphi(x, z)$ is selected equal to a constant or a first order polynomial, the above expressions revert into the previous estimate of method 1).

In both cases (2D and 3D), a third degree polynomial form is considered for the stress functions, with constant coefficients $A_i$ in 2D, and $A_i$, $B_j$, and $C_k$ in 3D. By applying the previous second derivative expressions these coefficients lead to linear functions of the geometrical coordinates x,z (in 2D case) or x,y,z (in 3D case) for the various components of the stress tensor. These linear expressions involve some of the coefficients $A_i$, $B_j$ or $C_k$ of the polynomial stress functions, which need to be determined and are the unknowns of the subsequent minimization process.

In full 3D, according to an embodiment, the stress functions are selected as the following third degree polynomial:

$$A(x, y, z) = \frac{A_1}{6}x^3 + \frac{A_2}{2}x^2y + \frac{A_3}{2}x^2z + \frac{A_4}{6}y^3 +$$

$$\frac{A_5}{2}y^2x + \frac{A_6}{2}y^2z + \frac{A_7}{6}z^3 + \frac{A_8}{2}z^2x + \frac{A_9}{2}z^2y$$

$$B(x, y, z) = \frac{B_1}{6}x^3 + \frac{B_2}{2}x^2y + \frac{B_3}{2}x^2z + \frac{B_4}{6}y^3 +$$

$$\frac{B_5}{2}y^2x + \frac{B_6}{2}y^2z + \frac{B_7}{6}z^3 + \frac{B_8}{2}z^2x + \frac{B_9}{2}z^2y$$

$$C(x, y, z) = \frac{C_1}{6}x^3 + \frac{C_2}{2}x^2y + \frac{C_3}{2}x^2z + \frac{C_4}{6}y^3 +$$

$$\frac{C_5}{2}y^2x + \frac{C_6}{2}y^2z + \frac{C_7}{6}z^3 + \frac{C_8}{2}z^2x + \frac{C_9}{2}z^2y$$

which, substituted in the previous expressions of the stress components, lead to:

$$\sigma_{xx}=(B_8+C_5)x+(B_9+C_4)y+(B_7+C_6-K_{0x}\gamma)z+\sigma_{xx0}$$

$$\sigma_{yy}=(C_1+A_8)x+(C_2+A_9)y+(C_3+A_7-K_{0y}\gamma)z+\sigma_{yy0}$$

$$\sigma_{zz}=(A_5+B_1)x+(A_4+B_2)y+(A_6+B_3-\gamma)z+\sigma_{zz0}$$

$$\sigma_{xy}=-C_2x-C_5y+\sigma_{xy0}$$

$$\sigma_{xz}=-B_3x-B_8z+\sigma_{xz0}$$

$$\sigma_{xy}=-A_6y-A_9z+\sigma_{xy0}$$

In 2D, according to a further embodiment the general format considered for the Airy function is a third degree polynomial, $$\varphi(x, z) = \frac{A_1}{6}x^3 + \frac{A_2}{6}x^2z + \frac{A_3}{6}xz^2 + \frac{A_4}{6}z^3$$

and the resulting stresses components of first degree in x and z:

$$\sigma_{zz}=A_1x+(A_2\gamma)z+\sigma_{zz0}$$

$$\sigma_{xx}=A_3x+(A_4+K_0\gamma)z+\sigma_{xx0}$$

$$\sigma_{xz}=-A_2x-A_3z+\sigma_{xz0}$$

Some of the unknown coefficients ($A_1$, $A_2$, $A_3$, $A_4$ in 2D, or $A_i$, $B_j$ and $C_k$, with i, j, k=1,9 in 3D) can be determined on the basis of fundamental considerations such as the fact that the vertical gradients of vertical stress be $\gamma$ and of horizontal stress be $K_{0y}\gamma$ ($A_2=A_4=0$ in 2D, and in 3D $B_7=C_6=A_7=C_3=0$, $A_6=-B_3$) and $B_9+C_4$, $C_1+A_8$, $A_5+B_1$ and $A_4+B_2$ can be considered a single variable since they appear together in the equations. The remaining unknown parameters are grouped in a vector denoted as $X_i$. (I=1,2 in 2D, and i=1,9 in 3D).

In a further embodiment, in order to determine these remaining unknowns, a prismatic subdomain is considered that is limited on the top and bottom by surfaces $S_1$ and $S_2$ which are plane but not necessarily horizontal, and are subject to the following boundary conditions:

Normal stress on the top surface is prescribed as a linear function of x, y and z Shear stress intensity on the top surface is also prescribed as a linear function of x, y and z.

Shear stress on the bottom surface is linked to the amount of normal stress on the same surface.

On the basis of those conditions, the following objective function $\phi(X_i)$ is defined:

$$\Phi(X_i) = \int_{S_1} (\sigma_n^{(\alpha)} - \overline{\sigma}^{(\alpha)})^2 dS_1 + \int_{S_1} (\tau^{(\alpha)} - \overline{\tau}^{(\alpha)})^2 dS_1 + \int_{S_2} (\tau^{(\beta)} - \overline{\tau}^{(\beta)})^2 dS_2$$

The function is the minimized with respect to each of the coefficients:

$$\frac{\partial \Phi(X_i)}{\partial X_i} = \frac{\partial}{\partial X_i} \int_{S_1} (\sigma_n^{(\alpha)} - \overline{\sigma}^{(\alpha)})^2 dS_1 + + \frac{\partial}{\partial X_i} \int_{S_1} (\tau^{(\alpha)} - \overline{\tau}^{(\alpha)})^2 dS_1 + \frac{\partial}{\partial X_i} \int_{S_2} (\tau^{(\beta)} - \overline{\tau}^{(\beta)})^2 dS_2 = 0$$

In these expressions, $\sigma_n^{(\alpha)}$, $\tau^{(\alpha)}$ are the normal and shear stresses of the proposed distribution on the top surface of the subdomain, $S_1$; $\tau^{(\beta)}$ is shear stress on the bottom surface of the subdomain, $S_2$; $\overline{\sigma}^{(\alpha)}$, $\overline{\tau}^{(\alpha)}$ are the normal and shear stress values to be prescribed on $S_1$, and $\overline{\tau}^{(\beta)}$ is the shear stress value to be prescribed on $S_2$.

The above system of partial derivatives leads to the same number of equations as unknowns $X_i$, which constitutes the algebraic system to be solved for the subdomain In order to obtain the $X_i$.

The above process is sequentially applied to each of the subdomains from the surface to the bottom, applying for the top layer of each, the same conditions for normal stress as obtained at the common surface of the upper subdomain, and the same shear values as prescribed to the upper subdomain on the common surface.

3) A third procedure is also proposed, involving first the elastic solution of the entire domain under gravity loads, and then a recalculation of the horizontal stress component according to the desired $K_0$. The detailed steps are the following:
   (i) to solve the elastic problem with gravity loads and on the entire domain of interest
   (ii) from this solution, to keep the values of the vertical stress at each point of the domain, and
   (iii) to recalculate horizontal stress values at each point by means of the desired $K_0$ and $K_{ani}$ coefficients.

Step b) Equilibrating the Proposed State

With the procedures disclosed in former step a), the estimated in-situ stress field will satisfy the desired stress ratio, but in general will not be in equilibrium. To ensure the consistency of the analysis, the method according to the invention includes an automatic equilibration stage b) which comprises imposing forces to the numerical mesh and the discretization given by steps b.1) and b.2) that are equal and opposite to the nodal forces that reflect the stress imbalance.

The unbalanced nodal forces (residual forces) are applied and redistributed in a single calculation (in the case of linear elastic materials) or with an iterative process until its components are sufficiently small (in the case of non-linear elastic materials, e.g. elasto-plastic).

The calculation of the unbalanced forces is performed as follows:
b.3) determining the gravity equivalent element force $f_e^{ext}$ in the finite element numerical mesh for each element using the expression $$f_e^{ext} = \int_{\Omega_e} N^T \rho g \, dV$$

wherein N is the element shape function matrix, $\rho$ is the mass density of the material and g is the gravity vector;

b.4) determining the internal element forces $f_e^{int}$ corresponding to the previously estimated state of stress from the expression $$f_e^{int} = \int_{\Omega_e} B^T \sigma^{prop} dV$$

wherein B is the element matrix relating strains and nodal displacements, and $\sigma^{prop}$ is the stress tensor expressible as $(\sigma_{xx}, \sigma_{yy}, \sigma_{zz}, \sigma_{xy}, \sigma_{xz}, \sigma_{yz})^T$;

b.5) determining the element stress imbalance (or residual forces) $f_e^{res}$ as the subtraction between the gravity equivalent element force and the internal element forces $$f_e^{res} = f_e^{ext} - f_e^{int}$$

b.6) assembling the element residual forces into the global nodal residual forces vector $f^{res}$, imposing the residual forces as nodal loads acting on the finite element mesh and solving the global system of equations $$Ku = f^{res}$$

wherein K is the global stiffness matrix and u is the global nodal displacements vector; and, next steps comprise accumulating the results of the previous operation to the previously estimated state of in-situ stress; that is, b.7) determining the deformation by means of the compatibility equation as $$\varepsilon_{kl} = \frac{1}{2}(u_{k,l} + u_{l,k})$$

b.8) determining the correction of the first state of in-situ stress by means of the material equation $$\Delta \sigma_{ij}^{corr} = E_{ijkl} \Delta \varepsilon_{kl}$$

where $E_{ijkl}$ is the same tensor of elasticity at each point of the domain, which has been used for the calculation of the global stiffness matrix K in step b.6); and, b.9) providing the sought in-situ stress $\sigma$ as the correction of the first state of in-situ stress given in step a) $\sigma^{prop} = (\sigma_{xx}, \sigma_{yy}, \sigma_{zz}, \sigma_{xy}, \sigma_{xz}, \sigma_{yz})$ as $\sigma = \sigma^{prop} + \Delta \sigma^{corr}$.

In this manner, an in-situ stress field in equilibrium that approaches the initial guess of in-situ stress (e.g. imposed $K_0$ condition) is obtained.

In view of FIG. 1, a first estimate of in-situ stress field (100) is obtained by:
generating a guess for the in-situ stress field (101);
performing computations to ensure that the in-situ stress field is in equilibrium (102); and,
accepting the computed equilibrated in-situ stress field as valid and proceed (103) with the subsequent steps of a numerical simulation based on the previous in-situ stress field result of performing computations to ensure that the initial stress field is in equilibrium (102).

The calculation of the unbalanced nodal forces and the correction of the initial estimate of in-situ stress are carried out by an iterative process if the material is a non-linear elastic material, e.g. elasto-plastic material, until the components of unbalanced forces, the corrections calculated from the unbalanced forces or both are sufficiently small.

Particular Example 1

Figure 2:
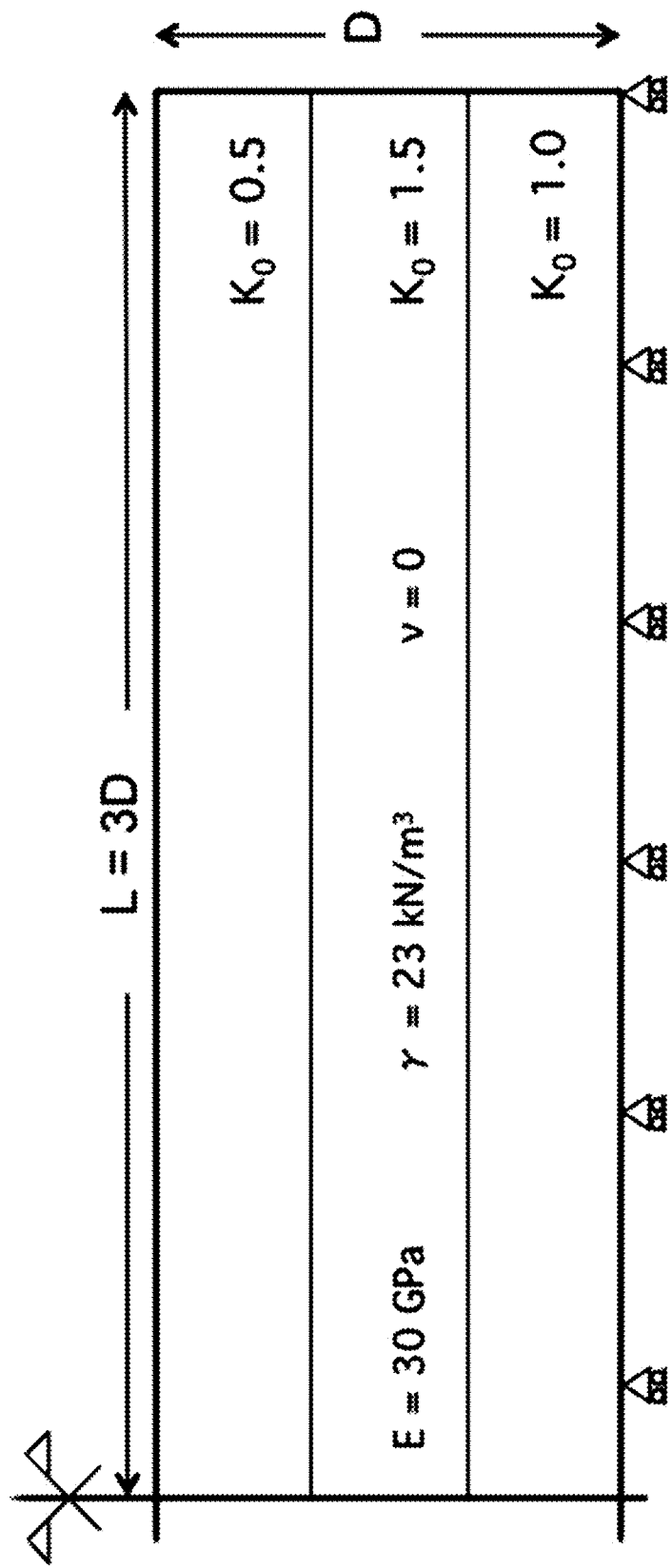
FIG. 2 This figure shows the domain Ω used in a first embodiment to apply the method of the invention.

FIGS. 2 to 6 illustrate a first particular embodiment, wherein the domain $\Omega$ comprises a plurality of layers depth D and length 6D. FIG. 2 represents just the half of the domain Ω, since it is symmetric. The layers are in-depth and an overburden pressure $\sigma_{ov}=\gamma D$ is taken into account.

In the more general case, the vertical stress $\sigma_V$ according to the direction z of gravity is determined according to the following steps:
- determining the straight vertical path C connecting the coordinate x and the point of the vertical projection of said coordinate x at the upper surface S limiting the domain Ω,
- determining $\sigma_V=\int_C \gamma(z)\, dz$ wherein $\gamma(z)$ is the specific weight of the material and the integral sign denotes the line integral along the path C, If the vertical stress $\sigma_{V_0}$ is known at certain depth, the path C starts on that depth and the integral is expressed as $\int_C \gamma(z)\, dz+\sigma_{V_0}$. Expressed in an alternative manner, when an overburden exists on the upper surface S of the domain Ω, the boundary conditions comprises said overburden pressure; therefore, for determining $\sigma_V=\int_C \gamma(z)\, dz$ along the path C the integral is evaluated at least in two parts, a first part for the contribution of the overburden at the coordinate x at the surface S in the path C; and a second part for the rest of the path C.

According to the invention, the upper surface S is the upper surface of the domain Ω. In most cases, the upper surface is the external ground surface. If this is not the case, the soil located above the upper surface S can be deemed as a mass generating an overburden pressure over the upper surface S.

Figure 3:
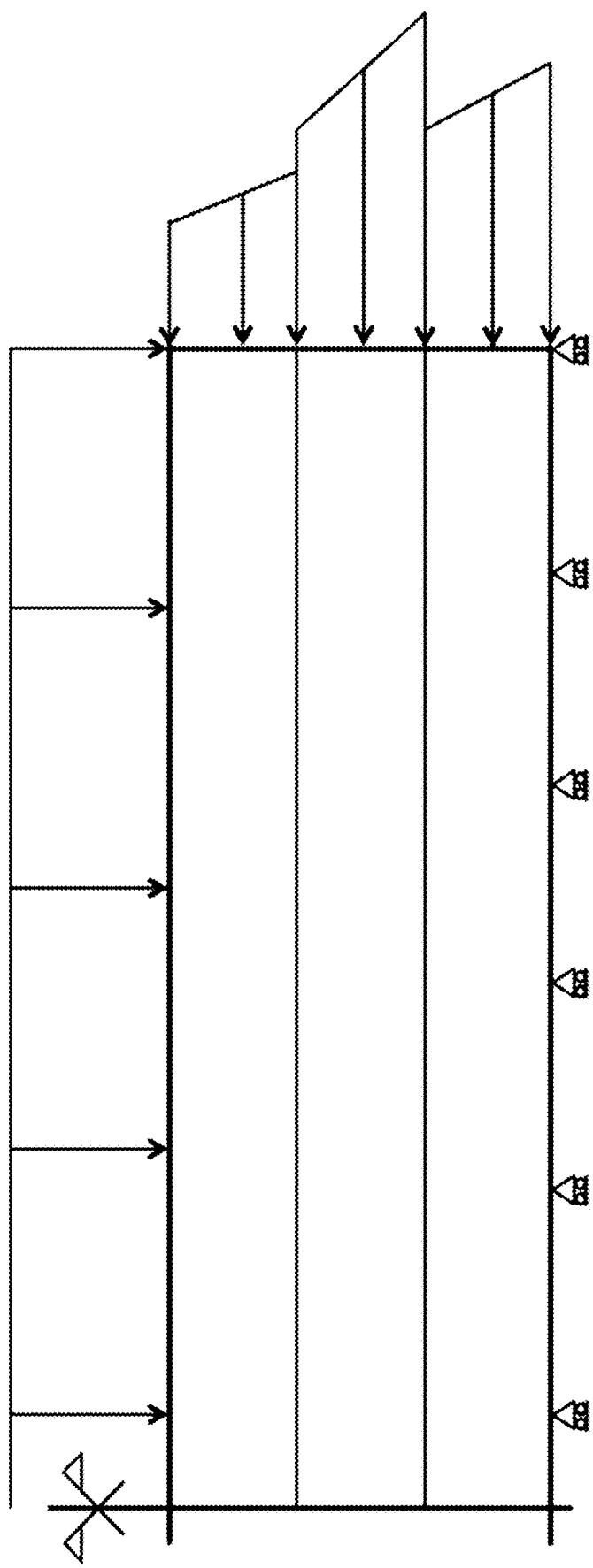
FIG. 3 This figure shows the Boundary Conditions used in a first embodiment of the method of the invention.
Figure 4:
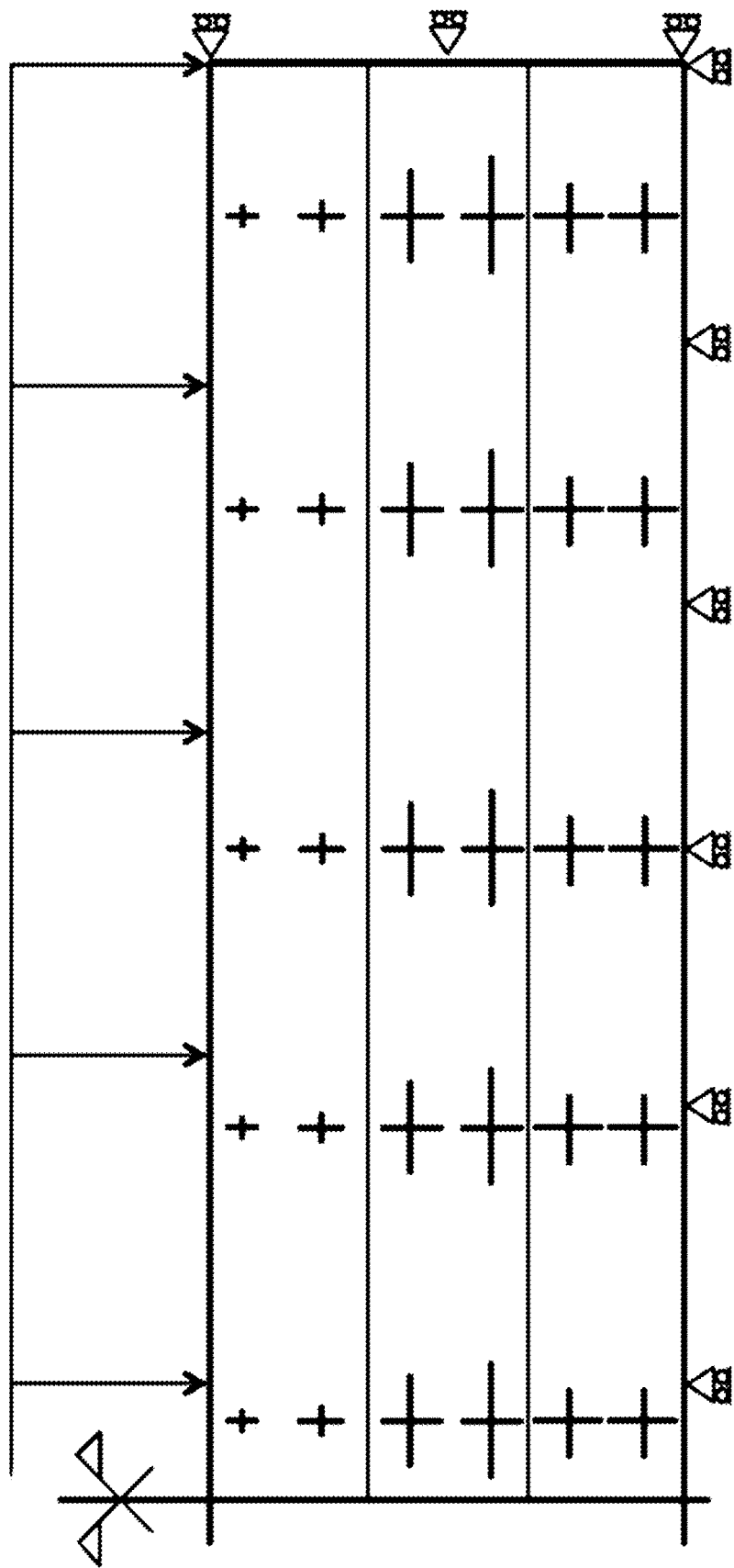
FIG. 4 This figure shows the in-situ stress field which results of the application of the step a) of a method of the invention in a first embodiment.
Figure 5:
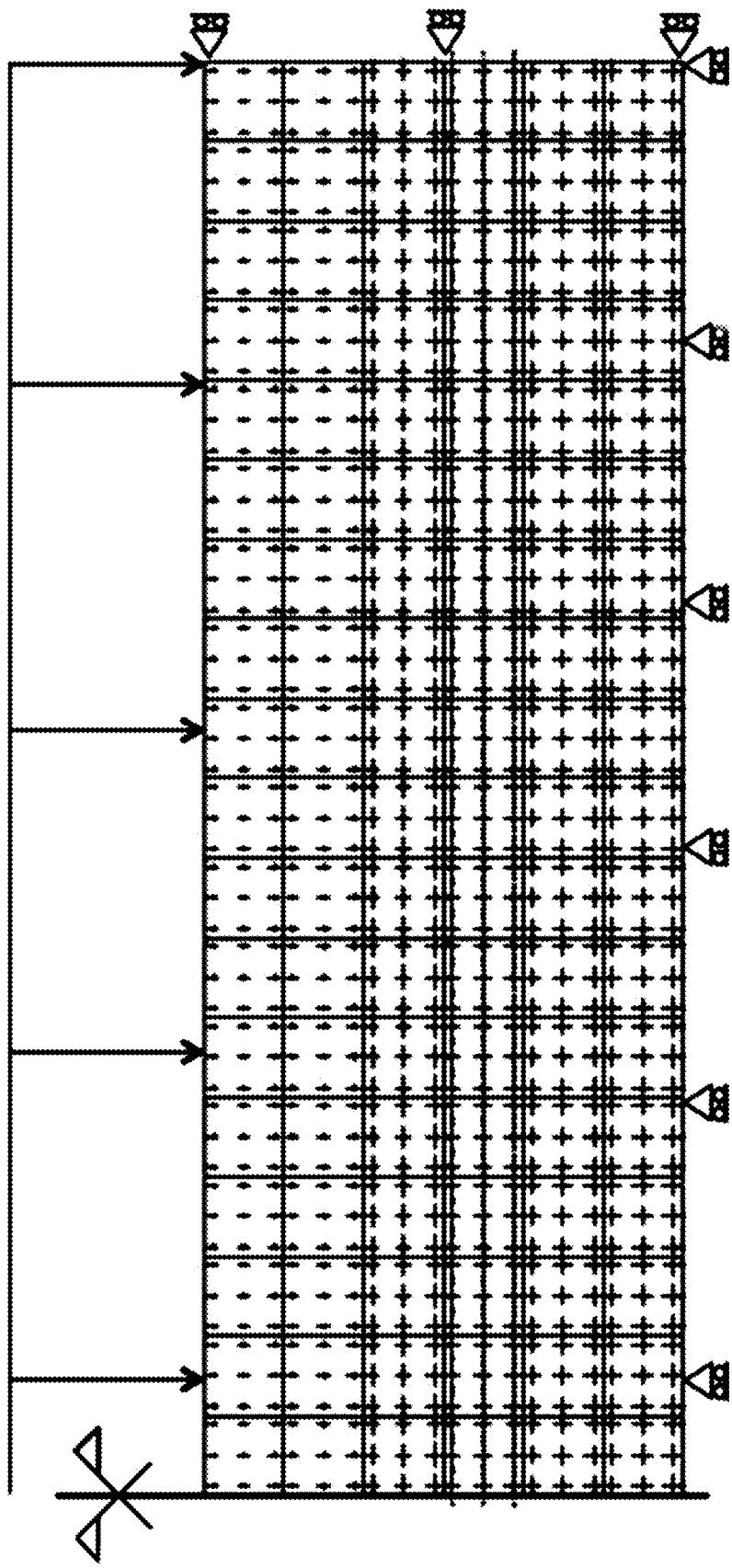
FIG. 5 This figure shows the in-situ stress field which results of the application of the step b) of a method of the invention in a first embodiment.

The boundary conditions for this example are shown in FIG. 3, considering the vertical stress given by overweight, including overburden, and the horizontal stress given by desired values, different for each layer.

The method of the invention is carried out according to the described steps. The result of applying step a) is the in-situ stress field shown in FIG. 4. Step b) is carried out over this in-situ stress field to achieve the estimate shown in FIG. 5. The final in-situ stress field does not perturb the vertical stress, and does not dilute the desired horizontal stresses that are specified on the boundary.

In all these figures, the results are represented as two lines in each Gauss point representing the principal stress direction (line orientation) and modulus (line length). The vertical one represents the value of the vertical stress and the horizontal one represents the value of the horizontal stress.

Figure 6:
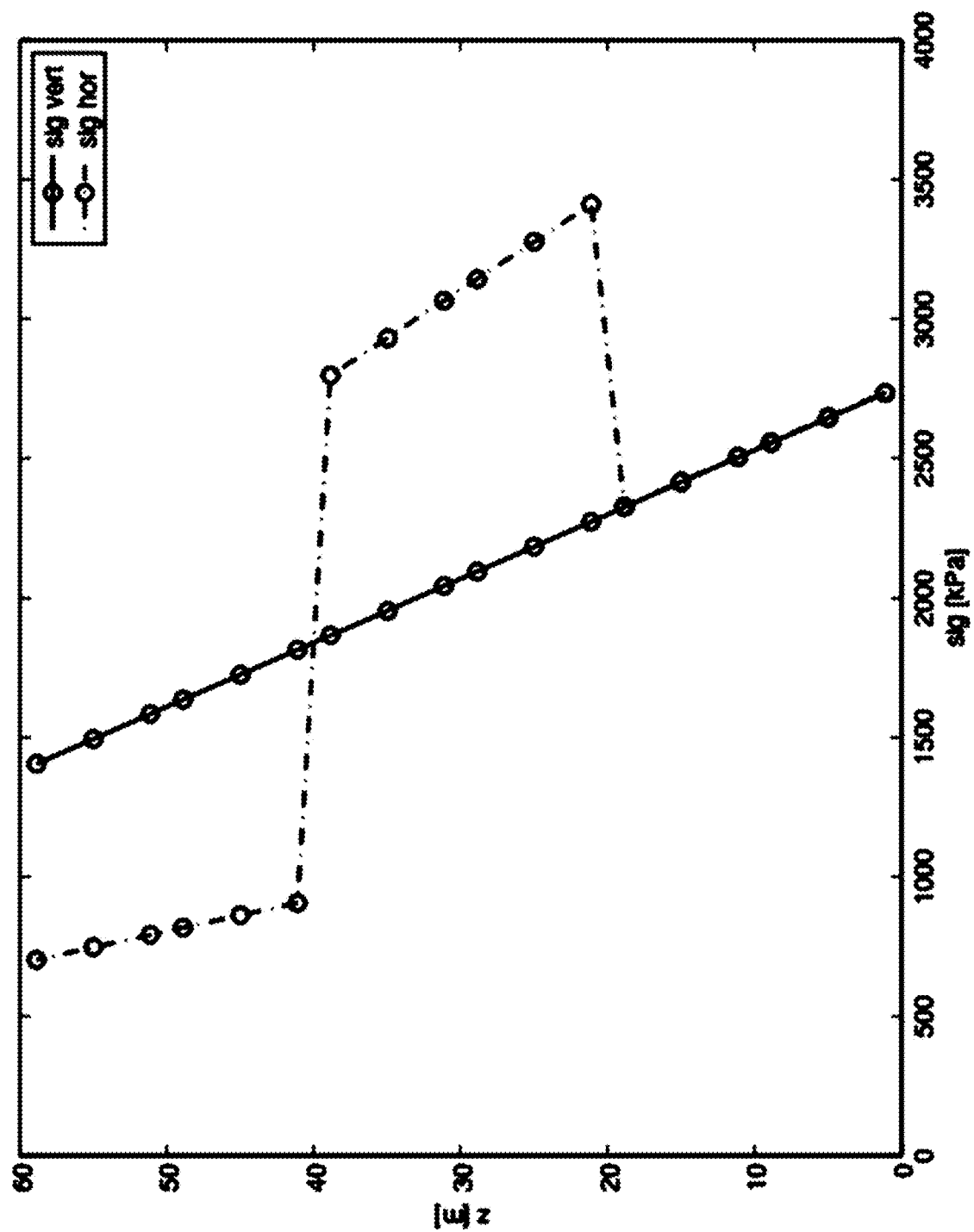
FIG. 6 This figure shows the principal in-situ stress components along a vertical section of the domain in FIG. 2.

FIG. 6 shows the principal in-situ stress components (vertical and horizontal stress) along a vertical section of the domain depicted in FIG. 2.

Particular Example 2

Figure 7:
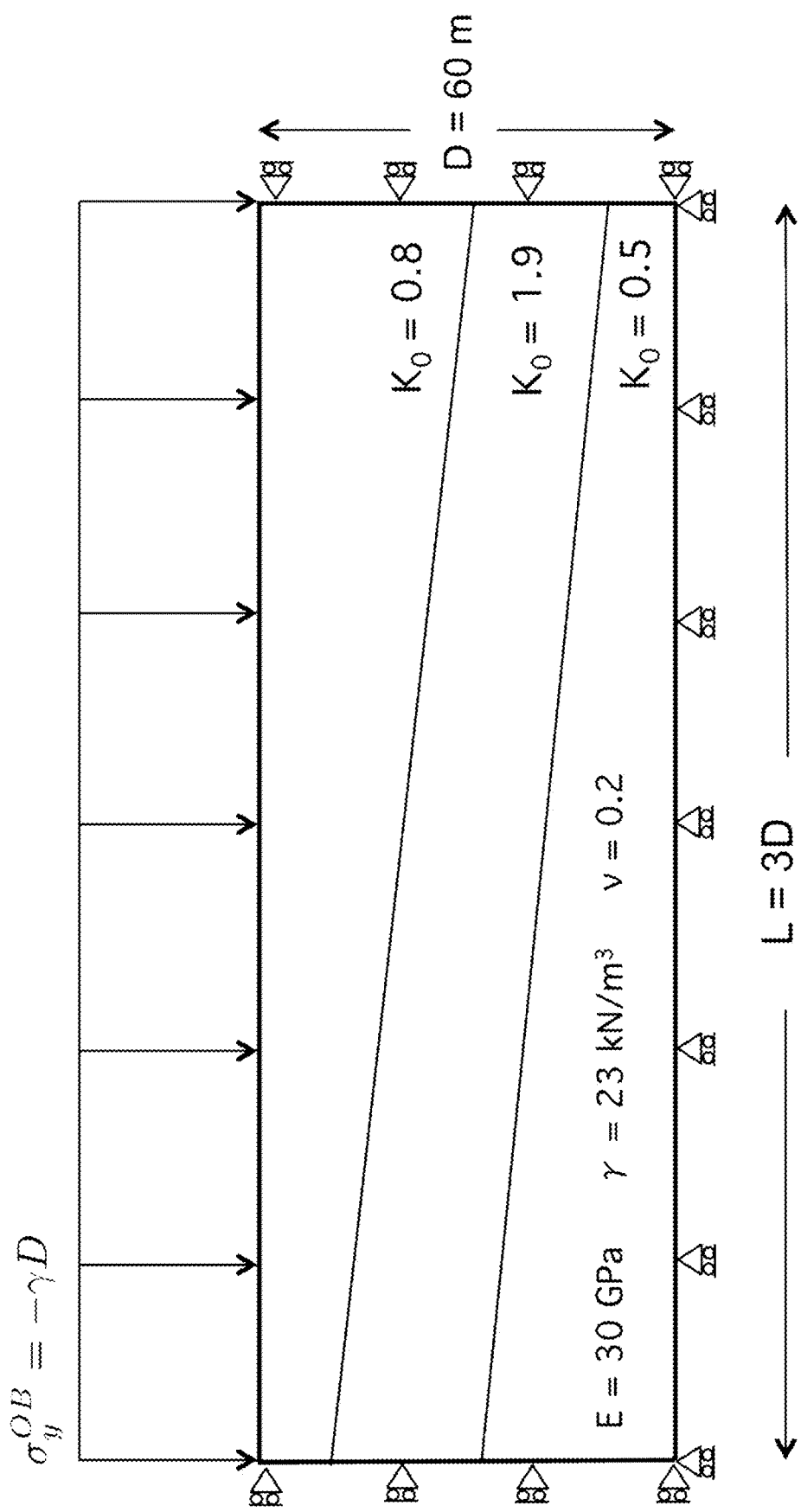
FIG. 7 This figure shows the domain Ω used in a first and a second embodiments to apply the method of the invention (particular examples 2 and 3)

FIG. 7 represents a second particular embodiment, wherein the domain Ω comprises a plurality of layers covering a depth D and length 3D. The domain of this particular example is not symmetric, since the interfaces between the layers are inclined, not parallel to the horizontal boundaries of the domain.

The proposed in-situ stress state is estimated by applying the step a) of the method according to the procedure 1) described above, that is, the values of parameters γ and $K_0$ for each layer which are shown in FIG. 7, are used directly to obtain the proposed stress a).

Figure 8:
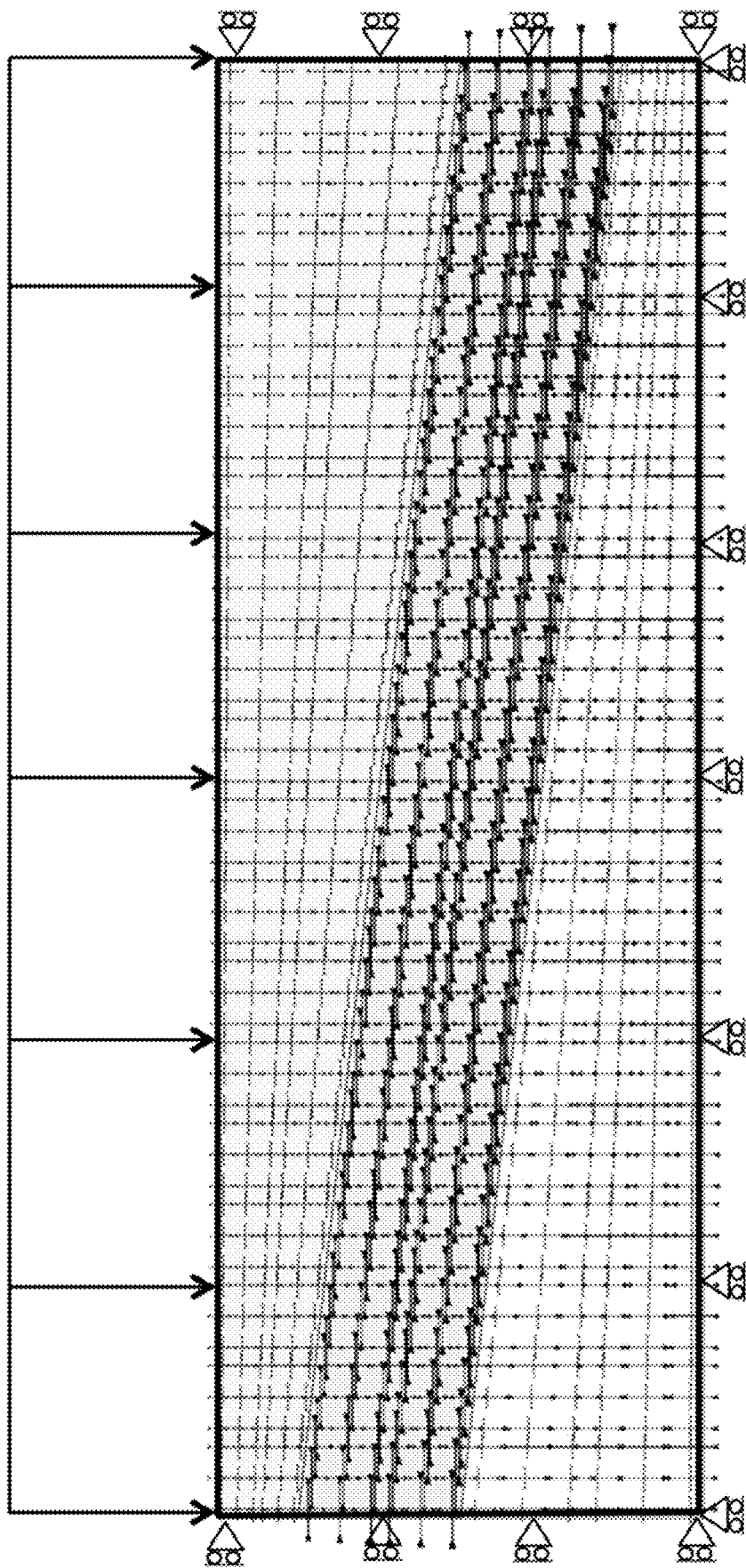
FIG. 8 This figure shows the in-situ stress field which results of the application of the step a) of a method of the invention in a first embodiment (particular example 2)
Figure 9:
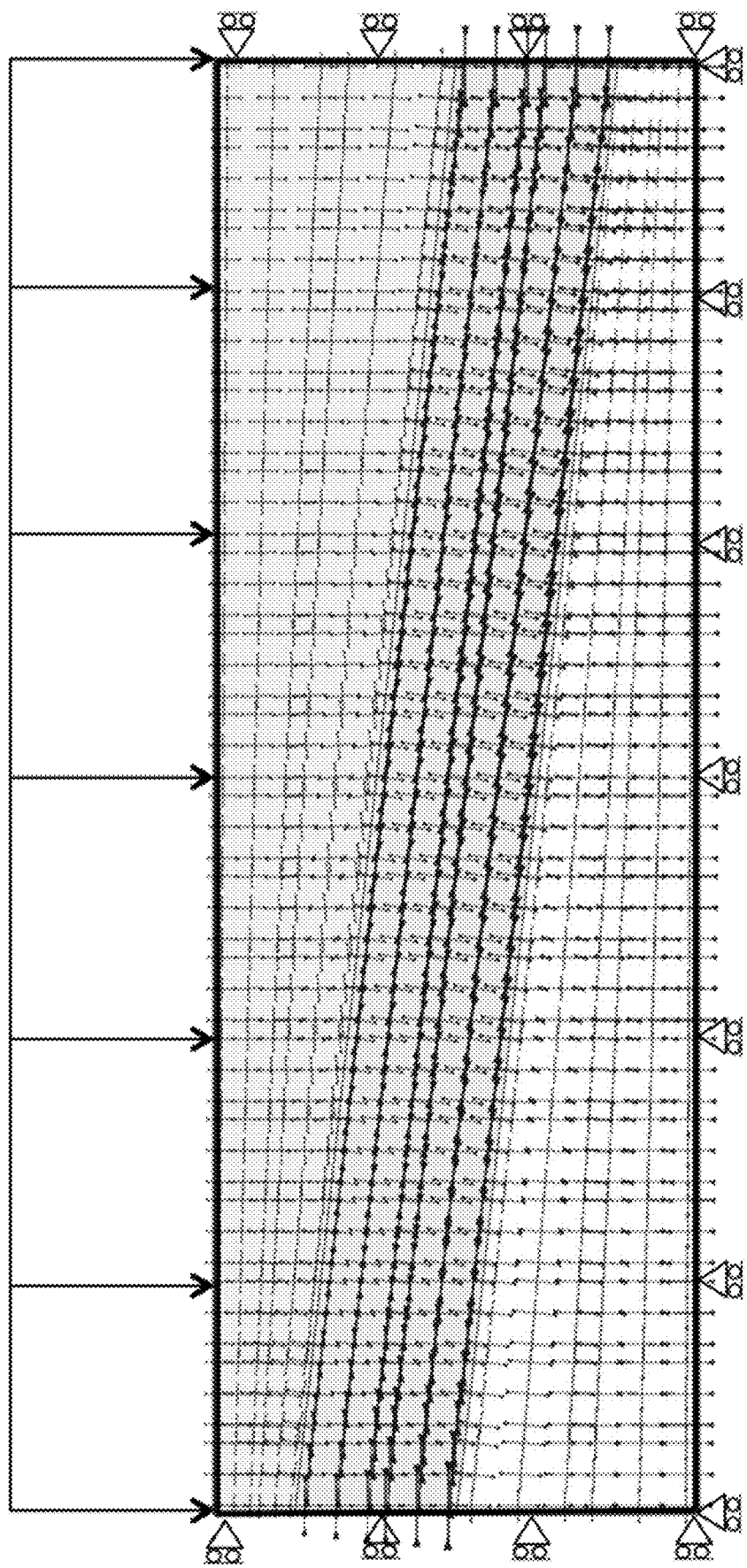
FIG. 9 This figure shows the in-situ stress field which results of the application of the step b) of a method of the invention in a first embodiment (particular example 2)
Figure 10A:
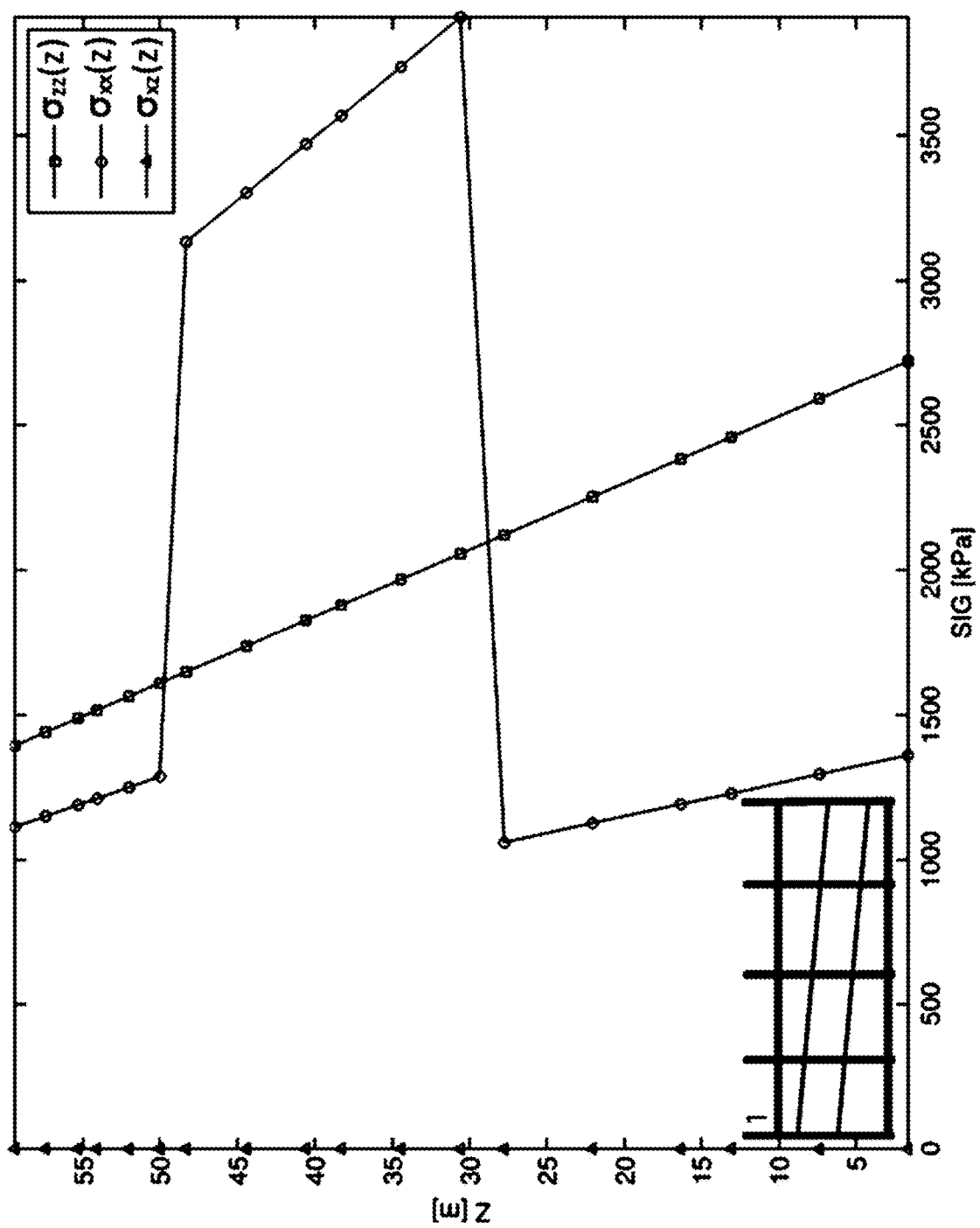
FIGS. 10a-10d These figures show the in-situ stress components along four vertical cross-sections of the domain in FIG. 7 in a first embodiment (particular example 2).
Figure 10B:
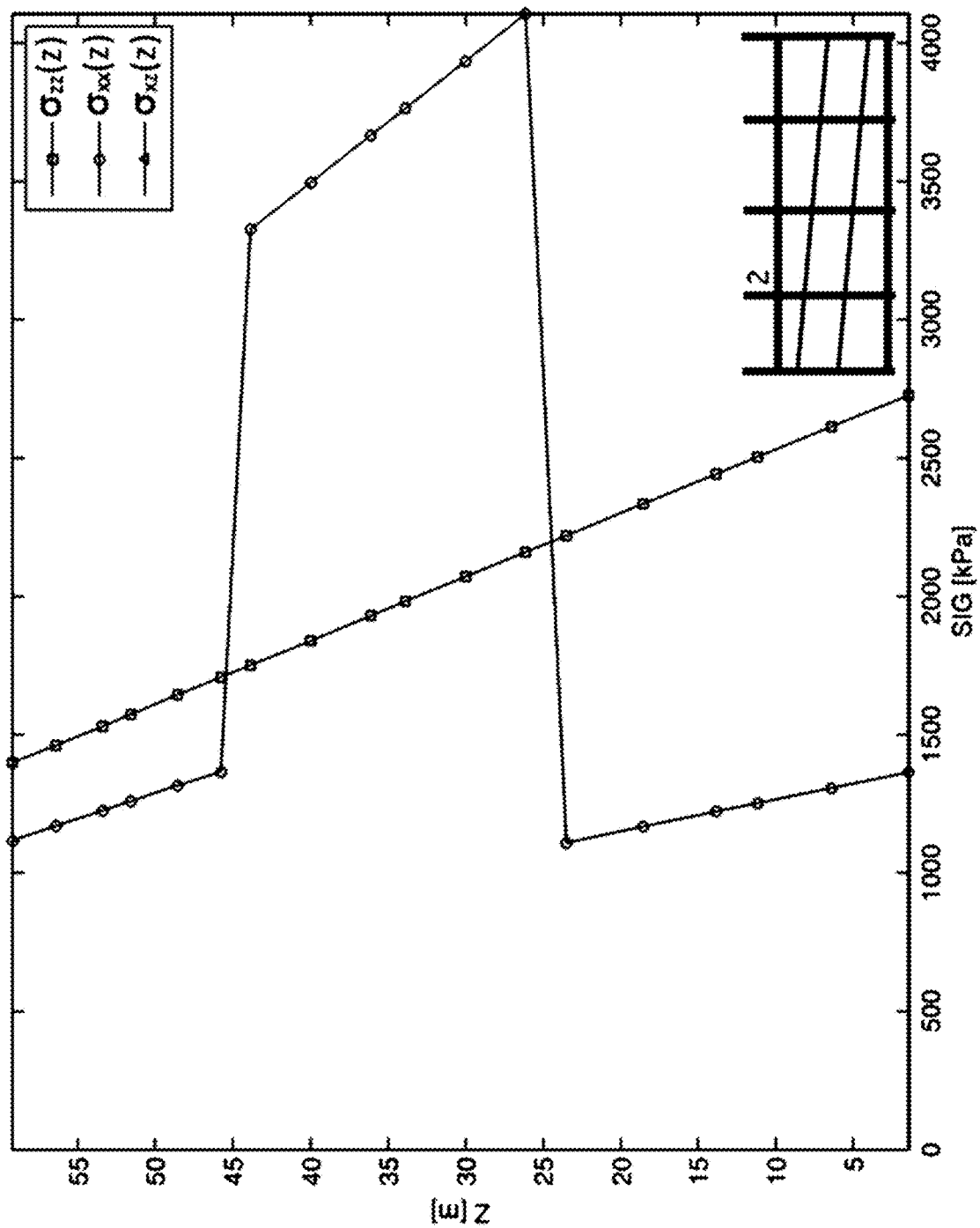
Figure 10C:
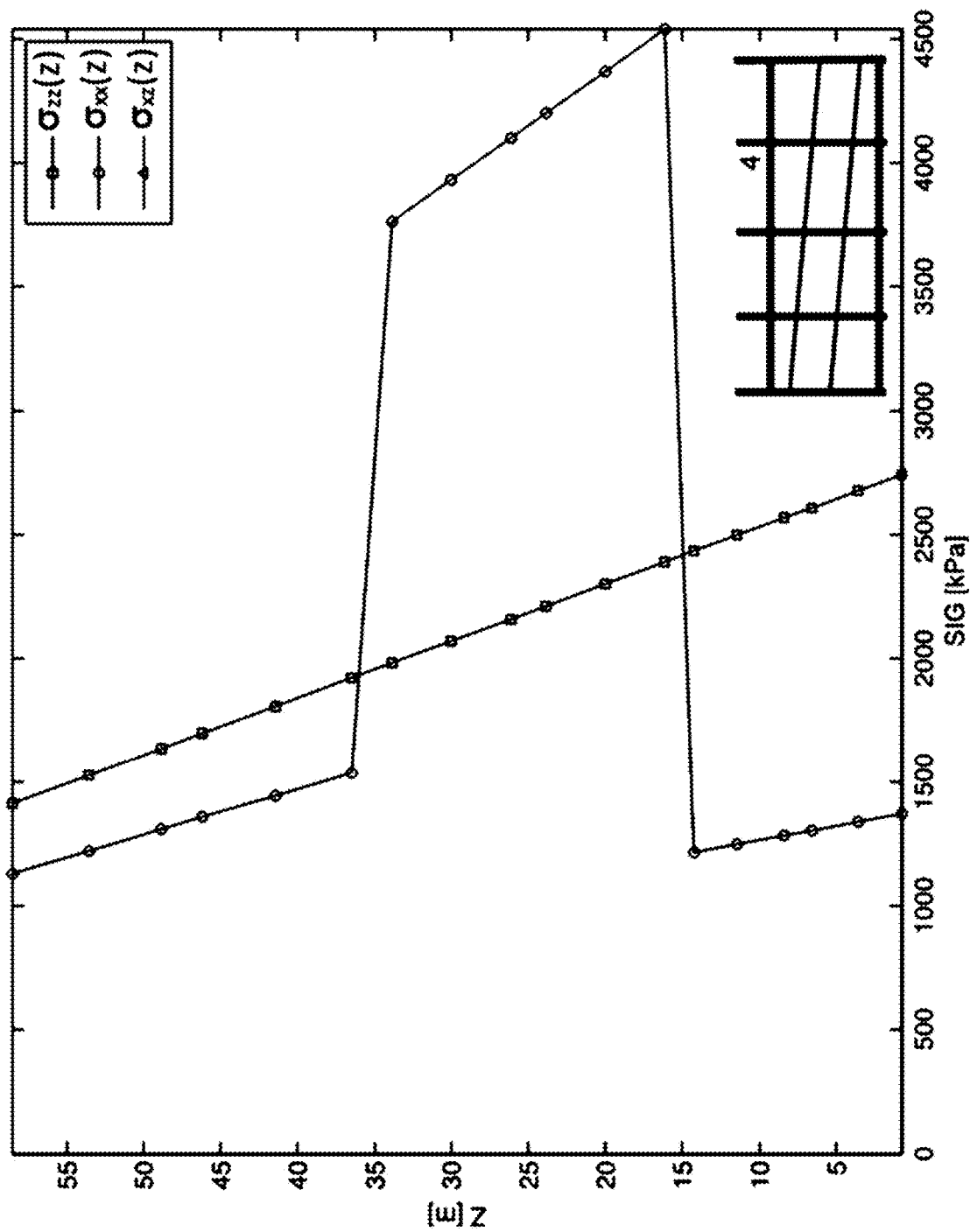
Figure 10D:
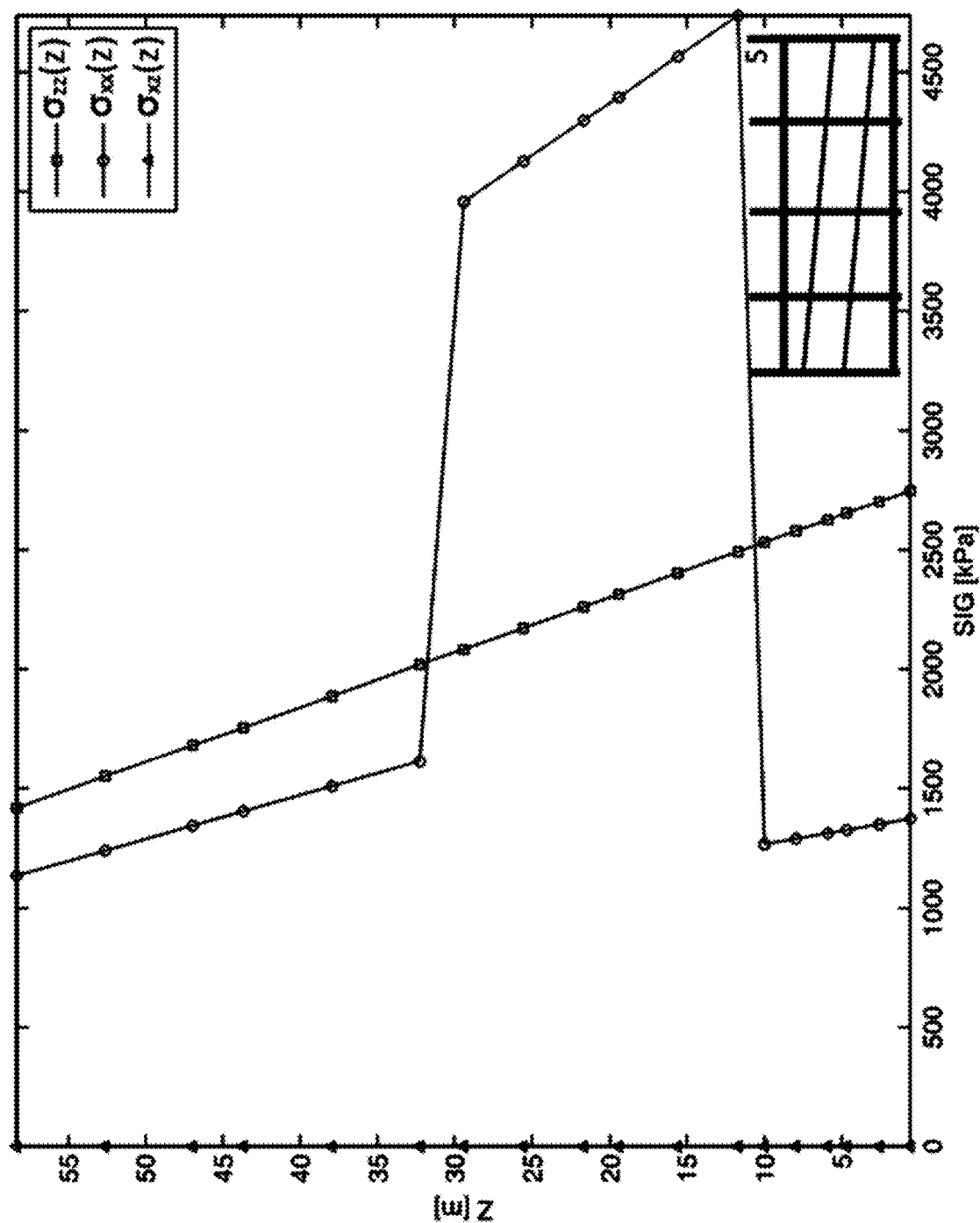

The result of step a) is the proposed in-situ stress field shown in FIG. 8. After this estimate, step b) of the method is applied, obtaining the in-situ stress field shown in FIG. 9.

FIGS. 10a, 10b, 10c and 10d show the components xx, zz and xz of the resulting in-situ stress along four vertical cross-sections of the domain depicted in FIG. 7. The sections represented are at 5, 45, 135 and 175 meters from the left boundary of the domain. The results show that the desired horizontal to vertical stress ratio $K_0$ is effectively recovered at all vertical cross-sections of the domain.

This in-situ stress, which turns out generally oriented with the geological layers, shows however some changes in direction near the vertical limits at left and right ends of the domain.

Particular Example 3

Figure 11:
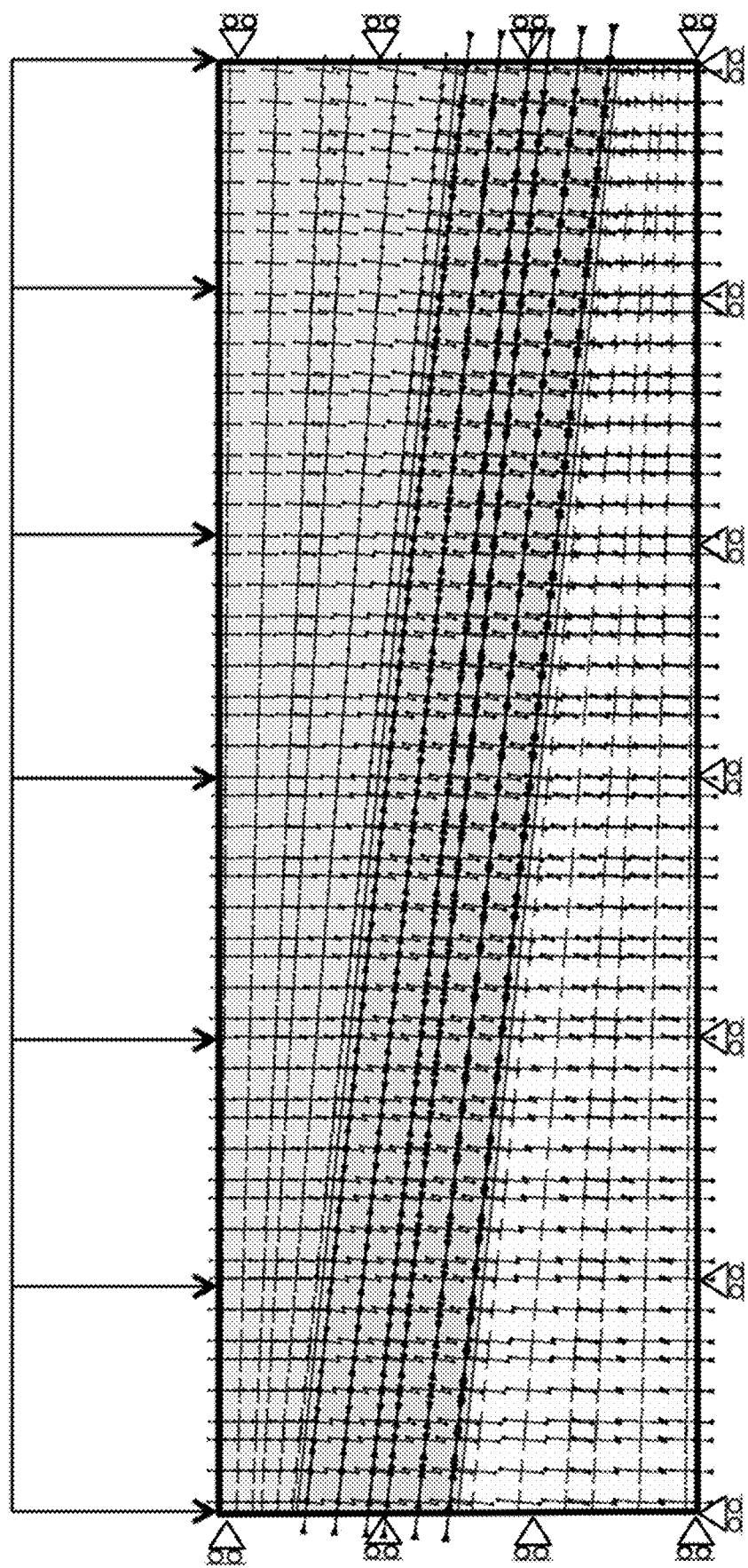
FIG. 11 This figure shows the in-situ stress field which results of the application of the step a) of a method of the invention in a second embodiment (particular example 3).

In this example, the domain Ω is the same as that in the previous example, but the trial estimate of the in-situ stresses is obtained by means of the Airy function of the embodiment 2) of the step a) as shown in FIG. 11. Due to the additional constants, not only values of parameters γ and $K_0$ are enforced, but also the condition of no shear stress on the inter-layer contact surface.

Figure 12:
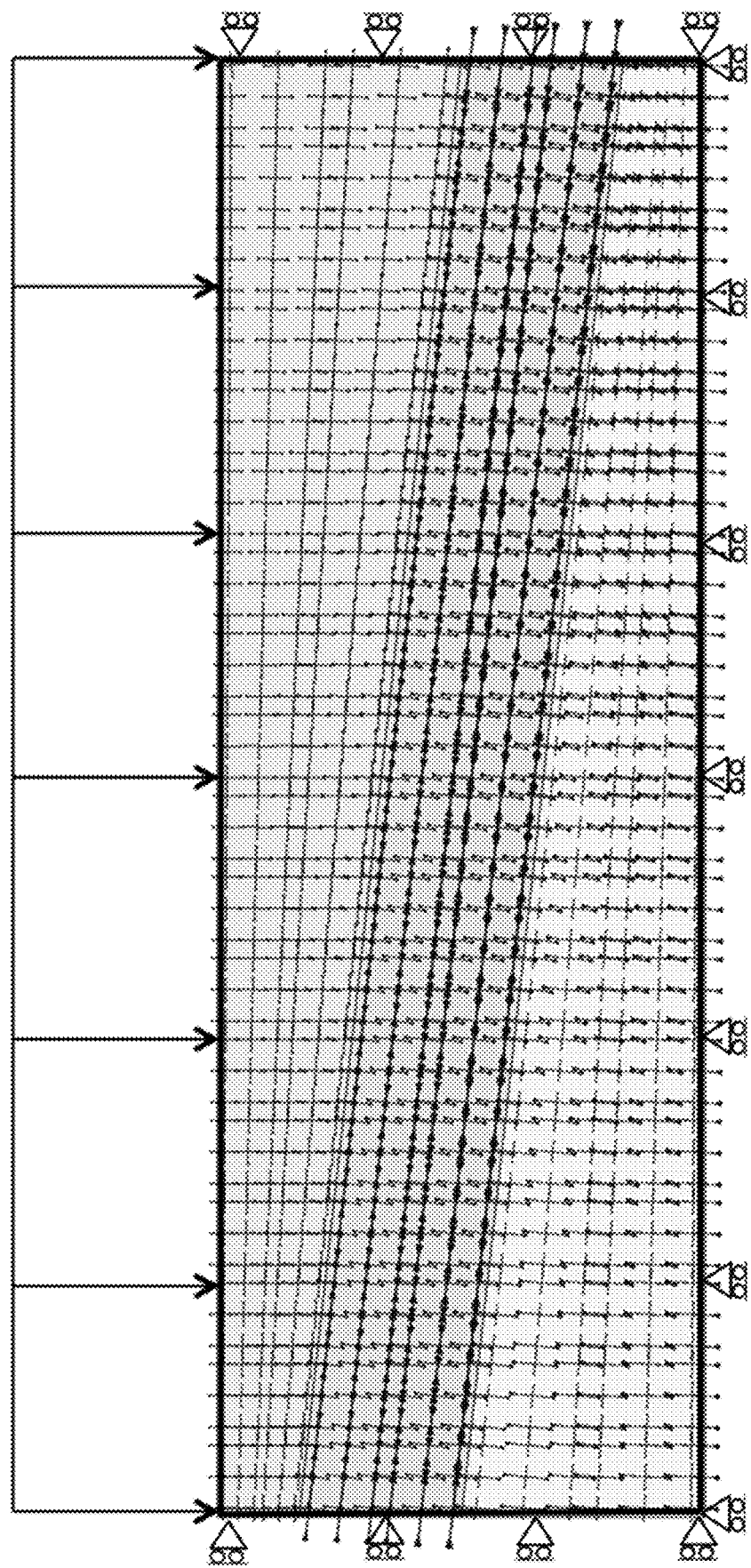
FIG. 12 This figure shows the in-situ stress field which results of the application of the step b) of a method of the invention in a second embodiment (particular example 3).
Figure 13A:
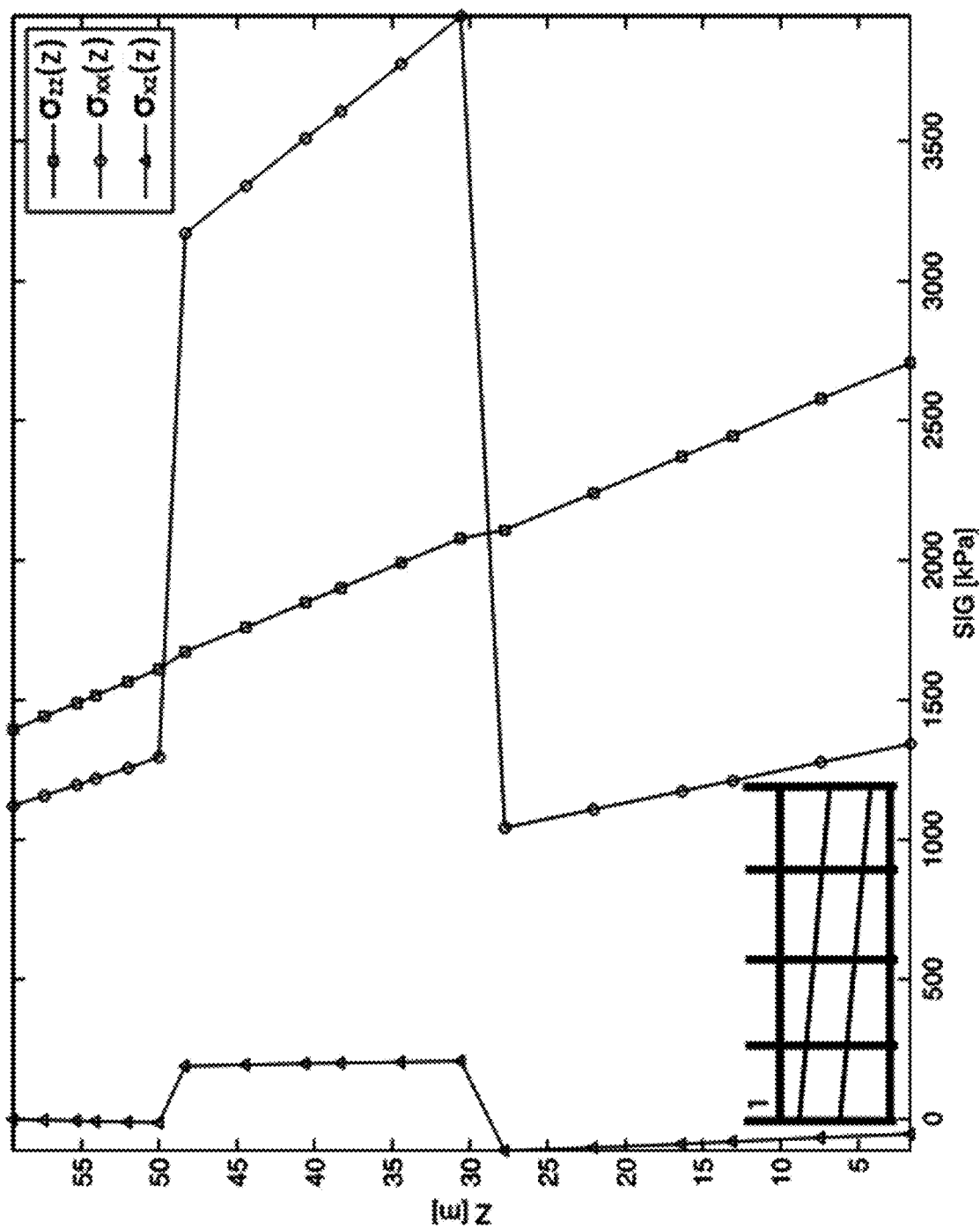
FIG. 13a-13d These figures show the in-situ stress components along four vertical cross-sections of the domain in FIG. 7 in a second embodiment (particular example 3).
Figure 13B:
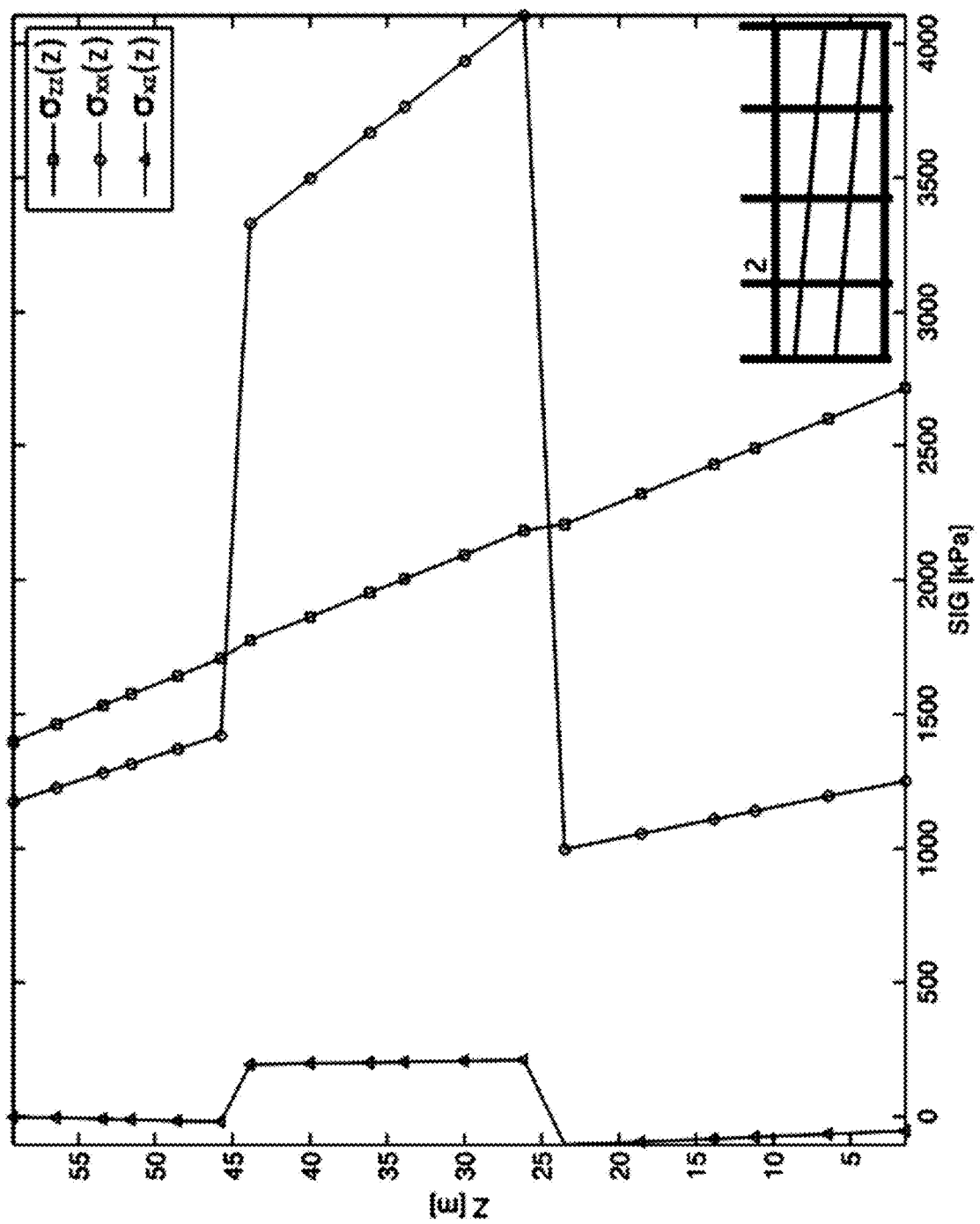
Figure 13C:
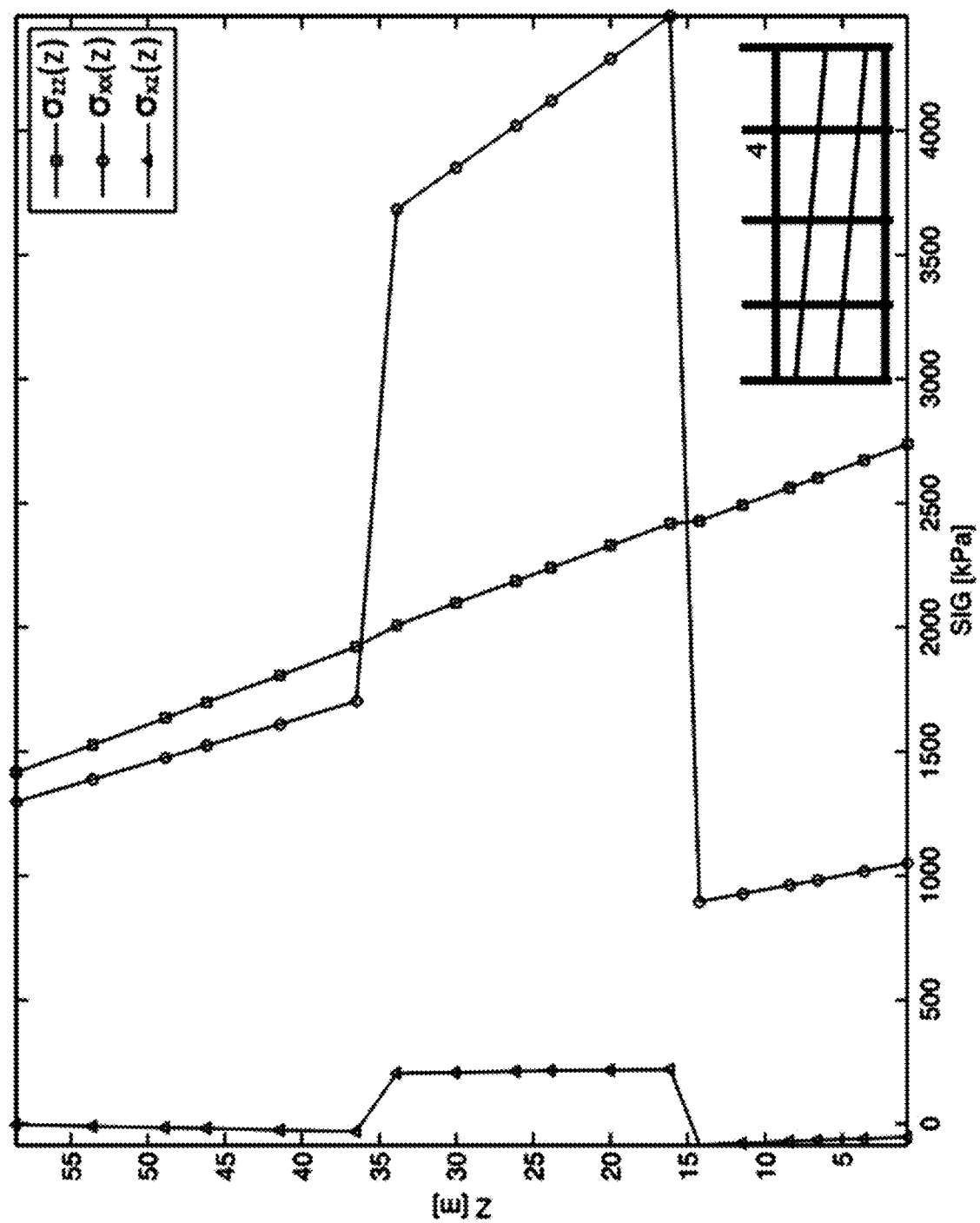
Figure 13D:
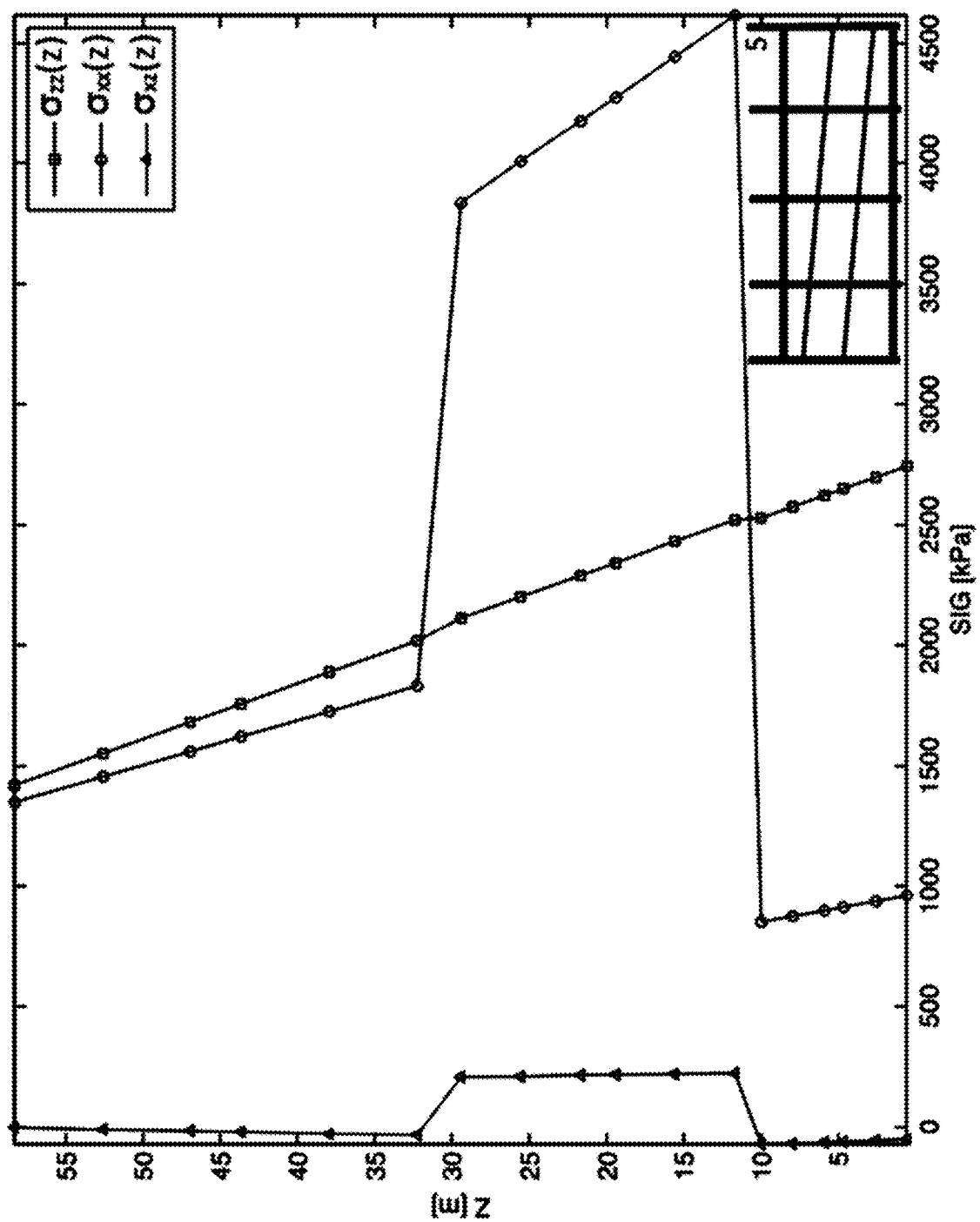

The final in-situ stress field after applying the step b) of a method according to the invention to this estimate of the in-situ stress field can be observed in FIG. 12 and the stress components $\sigma_{xx}$, $\sigma_{zz}$, $\sigma_{xz}$ are plotted in vertical cross sections in FIGS. 13a, 13b, 13c and 13d. The sections represented are at 5, 45, 135 and 175 meters from the left boundary of the domain.

As it can be seen in FIG. 12, the stresses also turn out generally oriented with the layers, but in this case this happens in the entire domain including the left and right boundaries of the domain.

The invention claimed is:

1. A computer-implemented method for numerically modeling a geological structure by simulating an in-situ stress field in a domain Ω representing the geological structure, the method comprising the steps:
  a) determining a first estimate of an existing in-situ stress state, representable as the vector $\sigma^{prop}$ expressible by means of the stress components $\sigma_{xx}$, $\sigma_{yy}$, $\sigma_{zz}$, $\sigma_{xy}$, $\sigma_{xz}$, $\sigma_{yz}$ in the domain Ω;
  b) determining a correction $\Delta\sigma^{corr}$ to the first estimate $\sigma^{prop}$ of the in-situ stress state ($\sigma_{xx}$, $\sigma_{yy}$, $\sigma_{zz}$, $\sigma_{xy}$, $\sigma_{xz}$, $\sigma_{yz}$) carrying out the following steps:
    b.1). determining a finite element discretization of the domain Ω by means of a numerical mesh, being $\Omega_e$ the domain of a particular finite element;
    b.2). determining boundary conditions on a boundary B of the numerical mesh of the domain Ω, comprised of Dirichlet or prescribed displacements on a part $B_1$ of the boundary B, and a Newmann or prescribed stresses on a remaining part $B_2$ of the boundary, being $B=B_1 \cup B_2$;
    b.3). determining a gravity equivalent element force $f_e^{ext}$ in the finite element numerical mesh for each element using the expression $$f_e^{ext}=\int_{\Omega_e} N^T \rho p\, dV$$

wherein N is an element shape function matrix, p is a mass density of the material and g is a gravity vector;
    b.4). determining a internal element forces $f_e^{int}$ corresponding to the first state of in-situ stress obtained in the preceding step a) in the finite element mesh for all elements from the expression $$f_e^{int}=\int_{\Omega_e} B^T \sigma^{prop} dV$$

wherein B is an element matrix relating strains and nodal displacements, and $\sigma^{prop}$ is the stress tensor representable as $(\sigma_{xx}, \sigma_{yy}, \sigma_{zz}, \sigma_{xy}, \sigma_{xz}, \sigma_{yz})^T$;

b.5). determining the element stress imbalance $f_e^{res}$ as the subtraction between the gravity equivalent element force and the internal element forces $$f_e^{res} = f_e^{ext} - f_e^{int}$$

b.6). assembling element residual forces $f_e^{res}$ representing the stress imbalance at the element level into a global residual forces vector $f^{res}$ representing the stress imbalance in each node of the numerical mesh at the domain structural level; that is, each component of the global residual forces vector $f^{res}$ comprises the sum, extended over all elements, of the components of element residual forces $f_{res}^e$ related to the same node of said component of the global residual forces vector $f^{res}$; and, loading the domain discretized by the numerical mesh with the residual forces vector $f^{res}$ and solving the global system of equations $$Ku = f^{res}$$

where K is a global stiffness matrix and u is a global nodal displacements vector, with K resulting from the assembly of the individual elements stiffness matrix $K_e$ that corresponds to the integral over the volume of each finite element in the mesh:

$$K_e = \int_{\Omega_e} B^T E B dV$$

and the assembly procedure consists of the sum on the global stiffness matrix of the contribution of each individual stiffness matrix considering the transformation between the local numbering of each element and the global numeration at the structural level that accounts for the correspondence of degrees of freedom as it is standard procedure in finite element formulation, wherein E is the elasticity stiffness matrix with components $E_{ijkl}$ that define the linear elastic behavior $\Delta \sigma_{ij} = E_{ijkl} \Delta \varepsilon_{kl}$, wherein $\sigma_{ij}$ is the stress tensor, $\varepsilon_{kl}$ is the strain tensor and $E_{ijkl}$ is the elasticity tensor, b.7). determining a deformation by means of the compatibility equation as $$\varepsilon_{kl} = \frac{1}{2}(u_{k,l} + u_{l,k})$$

b.8). determining the correction of the first estimate of the in-situ state of stress by means of the material equation $$\Delta \sigma_{ij}^{corr} = E_{ijkl} \Delta \varepsilon_{kl}$$

where $E_{ijkl}$ is the same tensor of elasticity at each point of the domain, which has been used for the calculation of the global stiffness matrix K in step b.6); and, b.9). provide the sought in-situ stress σ as the correction of the first estimate of in-situ stress given in step a) $\sigma^{prop} = (\sigma_{xx}, \sigma_{yy}, \sigma_{zz}, \sigma_{xy}, \sigma_{xz}, \sigma_{yz})$ as $\sigma = \sigma^{prop} + \Delta \sigma^{corr}$; and c) simulating the in-situ stress field of the geological structure using the corrected estimate of the in-situ stress σ provided in step b.9).

2. The method according to claim 1 wherein the first estimate of in-situ stress representable as the vector $\sigma^{prop}$ expressible by means of the stress components $\sigma_{xx}, \sigma_{yy}, \sigma_{zz}, \sigma_{xy}, \sigma_{xz}, \sigma_{yz}$ in the domain Ω; before the correction, for certain coordinate $x = (x_0, y_0, z_0)$, is determined according to three orthogonal directions x, y, z respectively, by means of a vertical stress $\sigma_v$ according to the direction z of gravity, a first maximum horizontal stress $\sigma_H$ according to a first horizontal direction x, and a second minimum horizontal stress $\sigma_h$ according to a second horizontal direction y, wherein said stress components determination comprises the steps:

determining a straight vertical path C connecting the coordinate x and the point of the vertical projection of said coordinate x at the surface S, determining $\sigma_v = \int_C \Gamma(z) dz + \sigma_{v_0}$ wherein $\gamma(z)$ is a specific weight of the material and the integral sign denotes the line integral along the path C, determining $\sigma_h = K_0 \sigma_v$ wherein $K_0$ is the ratio between a minimum horizontal stress and vertical stress, determining $\sigma_H = K_{an} \sigma_h$ wherein $K_{an}$ is a predetermined horizontal stress ratio estimating the horizontal stress anisotropy, determining $\sigma_{xx} = \sigma_H$, $\sigma_{yy} = \sigma_h$, $\sigma_{zz} = \sigma_v$; and $\sigma_{xy} = \sigma_{xz} = \sigma_{yz} = 0$.

3. The method according to claim 2 wherein the specific weight of the material γ(z) is constant and then $\sigma_v = \gamma h$ being h the depth of the coordinate x from the surface S.

4. The method according to claim 2 wherein the boundary conditions comprises overburden pressure; therefore, for determining $\sigma_v = \int_C \gamma(z) dz$ along the path C the integral is evaluated at least in two parts, a first part for the contribution of the overburden at the coordinate x at the surface S in the path C; and a second part for the rest of the path C.

5. The method according to claim 4, wherein the first part is a known vertical stress called $\sigma_{v_0}$, and the second part is calculated for the rest of the path C.

6. The method according to claim 1 wherein the first estimate of in-situ stress representable as the vector $(\sigma_{xx}, \sigma_{yy}, \sigma_{zz}, \sigma_{xy}, \sigma_{xz}, \sigma_{yz})^T$ in the domain Ω by means of the stress components $\sigma_{xx}, \sigma_{yy}, \sigma_{zz}, \sigma_{xy}, \sigma_{xz}, \sigma_{yz}$ before the correction, is determined according to three orthogonal directions x, y, z respectively according to the following step:

calculate the six stress components from the Maxwell stress functions $$A(x, y, z), B(x, y, z), C(x, y, z):$$

$$\sigma_{xx} = \frac{\partial^2 B}{\partial z^2} + \frac{\partial^2 C}{\partial y^2} + K_{0x} \gamma z + \sigma_{xx0}$$

$$\sigma_{yy} = \frac{\partial^2 C}{\partial x^2} + \frac{\partial^2 A}{\partial z^2} + K_{0y} \gamma z + \sigma_{yy0}$$

$$\sigma_{zz} = \frac{\partial^2 A}{\partial y^2} + \frac{\partial^2 B}{\partial x^2} + \gamma z + \sigma_{zz0}$$

$$\sigma_{xy} = -\frac{\partial^2 C}{\partial x \partial y} + \sigma_{xy0} \quad \sigma_{xz} = -\frac{\partial^2 B}{\partial x \partial z} + \sigma_{xz0} \quad \sigma_{yz} = -\frac{\partial^2 A}{\partial y \partial z} + \sigma_{yz0}$$

wherein $K_{0x}$ and $K_{0y}$ are the predefined ratios of horizontal-to-vertical stresses in the x- and y-directions respectively, $\sigma_{xx0}, \sigma_{yy0}, \sigma_{zz0}, \sigma_{xy0}, \sigma_{xz0}$ and $\sigma_{yz0}$ represent the values of the in-situ stress state at the point x=y=z=0 of the domain Ω, and A(x, y, z), B(x, y, z), C(x, y, z) are three functions determined by solving the following partial differential equation:

$$\nabla^4 A + \nabla^4 B + \nabla^4 C = \frac{3}{2-\nu}\left(\frac{\partial^2 A}{\partial x^2} + \frac{\partial^2 B}{\partial y^2} + \frac{\partial^2 C}{\partial z^2}\right)$$

under the boundary conditions, wherein ν is the Poisson ratio.

7. The method according to claim 1, wherein the material has non-linear elastic properties and steps b.3) to b.9) of the calculation of the unbalanced nodal forces and the correction of the state of in-situ stress is carried out by an iterative process until the components of unbalanced forces, the corrections calculated from the unbalanced forces or both are sufficiently small.

8. An electronic device for processing data, the device comprising a processor and a non-transitory memory storing instructions which, when executed by the processor, cause the processor to carry out the method for estimating an in-situ stress field in a geological structure according to claim 1.

9. A non-transitory computer program product, comprising computer-implementable instructions, which, when executed by a computer, cause said computer to perform the method for estimating an in-situ stress field in a geological structure according to claim 1, wherein the non-transitory computer program product is stored on a computer-readable medium.

* * * * *